United States Patent [19]

Shimizu

[11] Patent Number: 5,498,072
[45] Date of Patent: Mar. 12, 1996

[54] ANTI-SKID CONTROL SYSTEM FOR AUTOMOTIVE VEHICLES

[75] Inventor: Kouichi Shimizu, Sagamihara, Japan

[73] Assignee: Nissan Motor. Co., Ltd., Kanagawa, Japan

[21] Appl. No.: 447,586

[22] Filed: May 23, 1996

[30] Foreign Application Priority Data

May 24, 1994 [JP] Japan .................................. 6-109957

[51] Int. Cl.$^6$ ..................................................... B60T 8/58
[52] U.S. Cl. ..................................... 303/191; 303/DIG. 7
[58] Field of Search .................................. 303/191, 163, 303/DIG. 7; 364/426.02

[56] References Cited

U.S. PATENT DOCUMENTS

| | | | |
|---|---|---|---|
| 4,545,623 | 10/1985 | Sato et al. | 303/DIG. 7 X |
| 5,015,042 | 5/1991 | Yoshino | 303/170 |
| 5,200,897 | 4/1993 | Makino et al. | 303/DIG. 7 X |

FOREIGN PATENT DOCUMENTS 2-169362  6/1990  Japan .
3-67764   3/1991  Japan .
4-27650   1/1992  Japan .

*Primary Examiner*—Josie Ballato
*Attorney, Agent, or Firm*—Lowe, Price, Leblanc & Becker

[57] ABSTRACT

An automobile anti-skid brake control system, comprises wheel-speed sensors, a pseudo vehicle speed generator, an arithmetic circuit for calculating a slip ratio of each road wheel, and a controller for controlling a wheel-brake cylinder pressure of each road wheel. The controller includes a compensation circuit for compensating a different-diameter wheel speed of a different-diameter road wheel with a small-sized emergency tire, utilizing an error rate of the different-diameter wheel speed with respect to the detected wheel speed of the other road wheel with a usual tire. The error rate is derived on the basis of a ratio of diameter-difference between the different-diameter road wheel and the other road wheel. The ratio of diameter-difference is derived on the basis of a maximum wheel speed corresponding to the different-diameter wheel speed and a second highest wheel speed of the detected wheel speeds. The controller controls each wheel-brake cylinder pressure so that the slip ratio derived from a compensated pseudo vehicle speed based on the compensated different-diameter wheel speed is adjusted to a predetermined reference slip ratio.

9 Claims, 6 Drawing Sheets

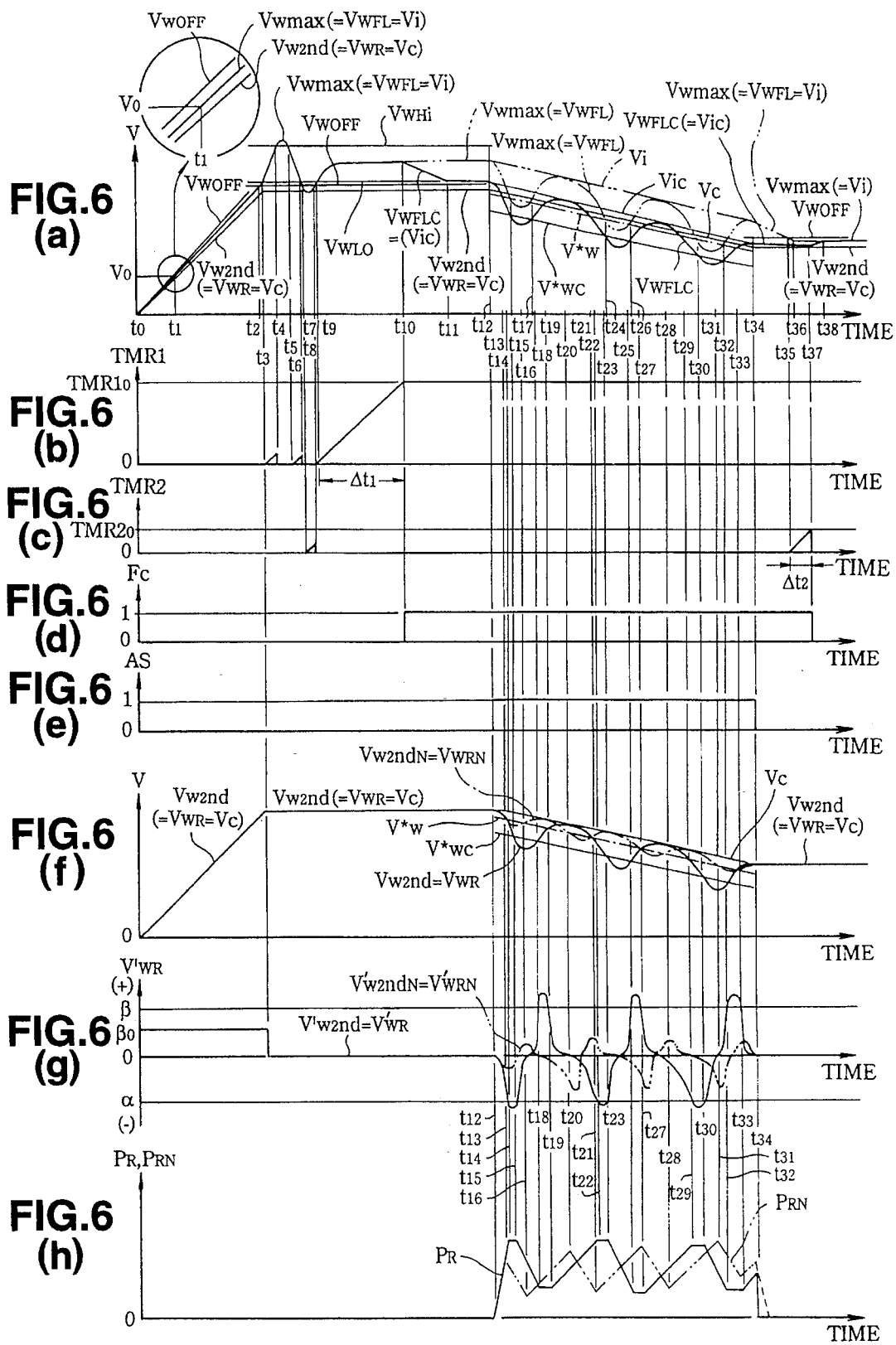

ANTI-SKID CONTROL SYSTEM FOR AUTOMOTIVE VEHICLES

BACKGROUND OF THE INVENTION

1. Field of the Invention

The present invention relates to an automotive anti-skid control system which prevents skidding and thus provides maximum effective braking and assures steering effect on turns by optimally controlling each wheel cylinder pressure, and specifically to a system which assures minimum possible braking distance during braking even when temporarily installing a comparatively small-sized tire such as an emergency tire, called a temper tire.

2. Description of the Prior Art

As is generally known, on conventional automotive anti-skid control systems which can prevent wheel lock during braking, each wheel-brake cylinder pressure is optimally controlled by adjusting a slip ratio at the slipping less-traction wheel towards a predetermined reference slip ratio. The slip ratio at the slipping less-traction wheel which is subjected to anti-skid control, is generally derived from the ratio of the deviation between a vehicle speed and a wheel speed detected at the slipping less-traction wheel with respect to the vehicle speed. On the other hand, the predetermined reference slip ratio means a desired slip ratio advantageous to assure both a steering effect on turns and a shorter braking distance during braking. For instance, when the derived slip ratio at the slipping less-traction wheel exceeds the reference slip ratio, the brake-fluid pressure to the associated wheel-brake cylinder is reduced. In contrast, when the slip ratio becomes less than the reference slip ratio owing to the above-mentioned reduction of the wheel-brake cylinder pressure, the wheel-cylinder pressure is built up again so as to adjust the slip ratio towards the reference slip ratio. The braking force at the slipping less-traction wheel, which is subjected to anti-skid control, can be adjusted by automatically controlling the braking operation as if automatic pumping brake action is executed in cycles. In the same manner, the wheel-cylinder pressure may be controlled so that the wheel speed detected at the less-traction wheel is adjusted towards a target wheel speed which can be derived from the vehicle speed in consideration, of the desired reference slip ratio at the less-traction wheel subjected to anti-skid control. In case that a vehicle speed derived from rotational speeds of the output shaft of an automotive transmission is used as a vehicle speed necessary to calculate a slip ratio at a slipping less-traction wheel subjected to anti-skid control, such a vehicle speed derived from the rotational speeds of the transmission output shaft tends to fluctuate during braking. Thus, in recent years, on the assumption that there is no occurrence of acceleration-slip (wheel-spin) at respective drive wheels during braking (the accelerator pedal is not depressed), a vehicle speed is estimated on the basis of the wheel speeds detected at the respective road wheels which can be subjected to the anti-skid control. As set out below in more detail, the vehicle speed can be estimated on the basis of the detected wheel speeds and a longitudinal acceleration exerted on the vehicle body. For instance, a pseudo vehicle-speed generator has been taught in Japanese Patent Provisional Publication (Tokkai Heisei) No. 4-27650, which is assigned by the same assignee as the present application. During anti-skid control, this pseudo vehicle-speed generator operates to set a maximum wheel speed detected at a rise time point corresponding to a setting point of a flag representing that the anti-skid control system comes into operation, as an initial value of the vehicle speed. The pseudo vehicle-speed generator is so designed to define the sum of the maximum wheel speed defined as the initial value of the vehicle speed and the integral of a longitudinal acceleration detected by a longitudinal-acceleration sensor, as a pseudo vehicle speed. On the assumption that drive wheels would not be brought into acceleration-slip during braking and on the fundamental concept that the anti-skid control would be made in a manner so as to avoid wheel-lock at the slipping less-traction wheel being under the anti-skid control, during anti-skid control, the detected maximum wheel speed is traditionally used for the purpose of estimation of the vehicle speed required to calculate a slip ratio. For the purpose of detecting the wheel speeds of the respective road wheels, an angular velocity of each road wheel, which angular velocity can be regarded to be substantially equivalent to an angular velocity of the axle, is ordinarily used to derive a wheel speed of each road wheel, since it is difficult to detect the actual rotational speed of the respective road wheel. Actually, serrated gear teeth are formed on the outer periphery of a brake disk which is mounted inside of the wheel hub for co-rotation together therewith. Rotation of the disk causes changes in magnetic field strength of a coil of wire opposing the gear. The serrated gear teeth and the coil cooperatively construct a so-called wheel-speed sensor. The changes in magnetic field strength of the coil can be usually detected as changes in voltage applied to the coil. In general, the angular velocity of the respective axle is derived by wave-forming the changes in voltage, and then the wheel speed is obtained by multiplying the derived angular velocity of the axle by the outside radius of the usual or standard tire except the small-sized or different-diameter emergency tire.

During actual vehicle traveling, in the case that the tire is punctured unexpectedly, an emergency tire would be installed in place of the punctured usual tire. In recent years, the outside diameter of an emergency tire mounted on passenger cars is so designed as to be small-sized, as compared with the outside diameter of a usual tire which usual tire is initially installed at the respective road wheel. The wheel speed of the road wheel with the small-sized emergency tire, detected by the above-noted wheel-speed sensor, tends to be greater than the wheel speed of the road wheel with the usual tire, owing to a conventional calculation of the wheel speed based on the angular velocity of the axle. For example, in the event that the actual vehicle speed is maintained at a constant speed during straight-ahead driving, the axle of the road wheel with the small-sized emergency tire must rotate faster than the axle of the road wheel with the usual tire. Thus, the angular velocity of the road wheel with the small-sized emergency tire tends to become greater than the angular velocity of the road wheel with the usual tire. As previously noted, since the detected value of the wheel speed, serving as a control parameter, is arithmetically derived by multiplying the angular velocity of the axle by the outside radius of the usual tire, the calculated value of the wheel speed of the road wheel with the small-sized emergency tire tends to be greater than that of any other road wheel with the usual tire. Assuming that the calculated value of the wheel speed at the road wheel with the small-sized emergency tire is utilized as the maximum wheel speed necessary to derive the above-noted pseudo vehicle speed, an estimate of the vehicle speed, i.e., the derived pseudo vehicle speed tends to become greater than the actual vehicle speed.

In the anti-skid control executed in accordance with the above-noted undesiredly greater estimate of the vehicle speed, a target wheel speed, which is derived on the basis of the estimate of the vehicle speed in such a manner as to satisfy the reference slip ratio, also becomes greater than an ideal target wheel speed which will be derived on the basis of the actual vehicle speed. The target wheel speed based on the estimate of the vehicle speed is often used as a threshold value necessary to determine whether pressure-reduction of brake fluid fed to the wheel brake cylinder should be started during the anti-skid control. In case that the calculated wheel speed at the road wheel with the small-sized emergency tire is utilized as the maximum wheel speed necessary for estimation of the vehicle speed, the detected value of the wheel speed at the respective road wheel generally tends to be less, as compared with the estimated vehicle speed. In the anti-skid control executed for adjustment of a wheel speed of a road wheel with the usual tire after the brakes are applied, pressure-reduction is generally started at the time point when the detected value of the wheel speed at each road wheel with the usual tire becomes below the target wheel speed in accordance with a decrease in the detected value of the wheel speed. As set out above, since the target wheel speed based on the estimated vehicle speed tends to be set at a higher level than the target wheel speed based on the actual vehicle speed in the case that the small-sized emergency tire is installed, the pressure-reduction start timing of the anti-skid control based on the estimated vehicle speed is thus advanced as compared with the pressure-reduction start timing of the anti-skid control based on the actual vehicle speed. Alternatively, in case of the anti-skid control wherein the above-noted target wheel speed is used as a threshold value necessary for initiation of pressure build-up at the wheel-brake cylinder which pressure build-up is executed after the pressure-reduction mode of the anti-skid control for the purpose of the recovery of the wheel speed to a direction wherein the wheel speed increases, supposing the respective detected value of the wheel speed is below the target wheel speed, pressure build-up is started at the time when the detected value of the wheel speed at each road wheel with the usual tire becomes above the target wheel speed in accordance with an increase in the detected value of the wheel speed. Since the target wheel speed based on the estimated vehicle speed tends to be set at a higher level than the target wheel speed based on the actual vehicle speed in the case that the small-sized emergency tire is installed, the pressure build-up start timing of the anti-skid control based on the estimated vehicle speed is retarded as compared with the pressure build-up start timing of the anti-skid control based on the actual vehicle speed. As set forth above, in both the pressure-reduction mode and the pressure build-up mode during anti-skid control, the wheel-cylinder pressure at the respective road wheels with the usual tire would be undesiredly set at a small value, because of retardation of the pressure build-up start timing and advancement of the pressure-reduction start timing. This results in an unexpectedly smaller braking force at the respective road wheel with the usual tire, as compared with the road wheel with the emergency tire. As a consequence, there is a possibility of increase in braking distance of the vehicle. To avoid the above-noted problem, further improved anti-skid control systems have been proposed in Japanese Patent Provisional Publication (Tokkai Heisei) No. 2-169362 and Japanese Patent Provisional Publication (Tokkai Heisei) No. 3-67764, for example. The former publication will be hereinafter referred to as a "first prior art", while the latter publication will be hereinafter referred to as a "second prior art". The first prior-art anti-skid control system is designed such that a maximum wheel speed detected at the road wheel with the small-sized emergency tire is not used for estimation or calculation of the vehicle speed, only when satisfying a predetermined condition wherein the deviation between maximum and minimum detected values of the wheel speeds of road wheels respectively having a usual tire except a road wheel having a small-sized emergency tire is kept within a predetermined first threshold and additionally the deviation between the maximum wheel speed detected at the road wheel with the emergency tire and the second greatest wheel speed corresponding to the maximum wheel speed of the road wheels with the usual tire is maintained above a predetermined second threshold for a predetermined first period of time or more. In the first prior-art anti-skid control system, in case that the deviation between the maximum wheel speed and the minimum wheel speed is maintained below a predetermined third threshold for a predetermined second period of time, the wheel speeds detected at all road wheels, are used for estimation or calculation of the vehicle speed, that is, the anti-skid control system operates to, release inhibition of calculation of the vehicle speed based on the above-noted maximum wheel speed. According to the first prior-art anti-skid control system, the vehicle speed can be arithmetically estimated from the detected value of the wheel speed at the respective road wheel with the usual tire except the detected value of the wheel speed at the road wheel with the small-sized emergency tire, before initiation of the anti-skid control. Therefore, the estimated or calculated value of the vehicle speed would be essentially equivalent to the actual vehicle speed, except a particular case such as an acceleration slip wherein drive wheels considerably slip at their wheel speeds above the vehicle speed. Assuming that the estimate of the vehicle speed which estimate is arithmetically derived from the detected values of wheel speeds other than the wheel speed detected at the small-sized emergency tire, is utilized for the anti-skid control, an optimally controlled braking force may be provided at least for the road wheels with the usual tire by the aid of a precise adjustment of the wheel-cylinder pressure.

In the second prior-art anti-skid control system, the vehicle speed is estimated or derived from the maximum value of all wheel speeds detected at the road wheel with the emergency tire as well as at the road wheels with the usual tire, in the conventional manner. The second prior-art anti-skid control system is characterized in that a corrected vehicle speed set at a lower level than the estimated vehicle speed by a predetermined correction value is used as a threshold value necessary for initiation of pressure build-up at the wheel-brake cylinder, and that a decision is made to determine whether a different-diameter tire such as a small-sized emergency tire having an outside diameter different from the other tires is installed, and that the above-mentioned predetermined correction value is increasingly compensated in the presence of the decision instruction representing that the tire having the different diameter is installed, so as to reduce the threshold value necessary for initiation of pressure build-up at the wheel-brake cylinder. That is to say, in the second prior-art anti-skid control system, a decreasingly compensated vehicle speed obtained by subtracting the increasingly compensated correction value from the estimated vehicle speed, is used as the target wheel speed, only in case that the different-diameter tire is installed. Assuming that the detected value of the wheel speed of the road wheel with the different-diameter tire, corresponding to the maximum wheel speed, is greater than the detected value of the wheel speed at any other road wheel with the usual tire by a predetermined ratio, that is to say, the ratio of the outside diameter of the different-diameter tire to the usual tire is set at a predetermined constant value, and that the setting relation of the increasingly compensated correction value, for example 10 km/h, to be subtracted from the estimated vehicle speed in case of the different-diameter tire installed at either one of the road wheels with respect to the uncompensated predetermined correction value, for example 3 km/h, to be subtracted from the estimated vehicle speed in case of the usual tires installed at all road wheels, is in proper correlation with the reciprocal of the above-noted outside-diameter ratio of the different-diameter tire to the usual tire, the target wheel speed based on the maximum wheel speed can be properly compensated as if the wheel speed detected at the road wheel with the different-diameter tire can be regarded as the wheel speed detected at the road wheel having the outside diameter substantially equivalent to the usual tire, even when the vehicle speed is estimated from the maximum wheel speed corresponding to the wheel speed at the different-diameter tire such as a small-sized emergency tire. Thus, in transit from the pressure-reduction mode of the anti-skid control to the pressure build-up mode of the anti-skid control, since the target wheel speed is decreasingly compensated as set out above and additionally the wheel speed at the road wheel subjected to the anti-skid control can quickly reaches the compensated target wheel speed serving as a threshold value necessary for initiation of pressure build-up at the wheel-brake cylinder, the pressure build-up start timing can be advanced and thus the wheel speed is smoothly recovered to the wheel-speed increasing direction. Accordingly, on the anti-skid control executed at least for the road wheels with the usual tire, the wheel-cylinder pressure may be optimally adjusted owing to the compensated target wheel speed. However, the second prior-art does not refer to the correlation between the ratio of the outside diameter of the different-diameter tire to the usual tire and the setting relation of the increasingly compensated correction value, such as 10 km/h, to be subtracted from the estimated vehicle speed in case of the different-diameter tire installed at either one of the road wheels with respect to the uncompensated predetermined correction value, such as 3 km/h, to be subtracted from the estimated vehicle speed in case of the usual tires installed at all road wheels.

In the first prior-art anti-skid control system, there is a possibility that the anti-skid control is uncertainly executed, because, until the deviation between the maximum wheel speed and the minimum wheel speed is below the predetermined threshold, the maximum wheel speed which would be detected at the road wheel with the different-diameter tire, cannot be used for estimation of the vehicle speed necessary for the anti-skid control, that is, the first greatest one of four detected wheel speeds required for estimation of the vehicle speed is neglected. For instance, in the event that the road wheels with the usual tire except the small-sized tire are all locked or beginning to lock, the deviation between the maximum wheel speed which would be detectable at the road wheel with the small-sized tire and the minimum wheel speed which would be detectable at the road wheel with the usual tire becomes great. In this case, the deviation, is thus maintained above the predetermined threshold. As previously noted, the vehicle speed is estimated from the second greatest wheel speed under a specified condition in which the maximum wheel speed is neglected. Under such a condition, the estimated vehicle speed will be set to a relatively smaller value than the actual vehicle speed. Necessarily, the target wheel speed will be also set to a comparatively small value on the basis of both the reference slip ratio and the relatively small estimate of the vehicle speed. Supposing this target wheel speed is set at a threshold value necessary for initiation of pressure-reduction at the wheel-brake cylinder, on the anti-skid control executed after braking, it is difficult that the respective detected wheel speed becomes below the target wheel speed, since the target wheel speed tends to be set at the small value in accordance with the decrease in the detected value of the wheel speed at the respective road wheel with the usual tire. As a result, the pressure-reduction start timing of the anti-skid control based on the estimated vehicle speed may be retarded as compared with the pressure-reduction start timing of the anti-skid control based on the actual vehicle speed. In contrast to the above, on the supposition that the target wheel speed is set at a threshold value necessary for initiation of pressure build-up at the wheel-brake cylinder in transit from the pressure-reduction mode of the anti-skid control to the pressure build-up mode according to the recovery of the wheel speed to the wheel-speed increasing direction, there is a possibility that the wheel speed of the road wheel subjected to the anti-skid control can be rapidly recovered to the target wheel speed. In this case, the pressure build-up start timing of the anti-skid control based on the estimated vehicle speed tends to be advanced as compared with the pressure build-up start timing of the anti-skid control based on the actual vehicle speed. As set forth above, in both the pressure-reduction mode and the pressure build-up mode during anti-skid control, the wheel-cylinder pressure at the respective road wheels with the different-diameter tire as well as the usual tire would be undesiredly set at a great value, because of retardation of the pressure-reduction start timing and advancement of the pressure build-up start timing. This results in an unexpectedly greater braking force at the road wheel with the usual tire other than the emergency tire. As appreciated, there is a possibility that each wheel speed cannot be properly adjusted within towards an optimal wheel-speed range adequate to get the reference slip ratio.

As previously explained, in the second prior-art anti-skid control system, the detected value of the wheel speed at a road wheel with a different-diameter tire such as a small-sized emergency tire and the detected values of the wheel speed at road wheels with a usual tire are all used for the purpose of estimation or calculation of a vehicle speed utilized as a control parameter of the anti-skid control, and additionally a target wheel speed serving as a threshold value necessary for initiation of pressure build-up at the wheel-brake cylinder is set at a decreasingly compensated speed level by increasingly compensating the above-noted predetermined correction value necessary for the estimate of the vehicle speed in the presence of the decision instruction representing that the different-diameter tire is installed. However, the anti-skid control system made according to the second prior-art does not sufficiently take account of the correlation between the ratio of the outside-diameter of the different-diameter tire to the usual tire and the setting relation of the increasingly compensated correction value, such as 10 km/h, to be subtracted from the estimated vehicle speed based on the detected wheel speeds at all road wheels including the different-diameter road wheel with respect to the uncompensated predetermined correction value, such as 3 km/h, to be subtracted from the estimated vehicle speed based on only the detected wheel speeds at the road wheels with the usual tire. As detailed in the description of the second prior art (the Japanese Patent Provisional Publication No. 3-67764), since the predetermined correction value to be subtracted from an estimate of the vehicle speed based on only the wheel speeds detected at the road wheels with the usual tire is set univocally at 3 km/h, and additionally the increasingly compensated correction value to be subtracted from an estimate of the vehicle speed based on the wheel speeds detected at one road wheel with the different-diameter tire and at the other road wheels with the usual tire is set univocally at 10 km/h, the target wheel speed which is used as a threshold value necessary for initiation of pressure build-up at the wheel-brake cylinder and calculated in consideration of either the predetermined correction value or the increasingly compensated correction value, cannot always reflect the outside-diameter ratio of the different-diameter tire to the usual tire accurately, in case that the reciprocal of the ratio of an estimate of the vehicle speed based on the maximum wheel speed corresponding to the detected value of the wheel speed at the road wheel with the different-diameter tire with respect to an estimate of the vehicle speed based on the detected values of the wheel speed at the road wheels with the usual tire, is not in proper correlation with the setting relation between the increasingly compensated correction value (e.g. 10 km/h) and the predetermined correction value (e.g. 3 km/h). In this case, if the wheel-brake cylinder pressure, i.e., the braking force is controlled in accordance with the target wheel speed derived in the manner as set out above, there is a possibility that the respective wheel speed cannot be adjusted within towards the above-noted optimal wheel-speed range adequate to satisfy the reference slip ratio with regard to the road wheels with a usual tire. Furthermore, it will be appreciated that the wheel-speed control for the road wheel with a different-diameter tire cannot be executed precisely in case that such a target wheel speed which speed will be derived in accordance with the control procedure of the second prior-art anti-skid control system, is applied for the purpose of adjustment of the wheel speed at the road wheel with the different-diameter tire.

SUMMARY OF THE INVENTION

Accordingly, it is an object of the present invention to provide an improved anti-skid control system for automotive vehicles which avoids the foregoing disadvantages of the prior art.

It is another object of the invention to provide an improved automotive anti-skid control system which can provide both an accurate pressure-reduction start timing and an accurate pressure build-up start timing during anti-skid control, even when a different-diameter road wheel with a small-sized emergency tire is temporarily installed in place of a punctured tire, for instance.

It is a further object of the invention to provide an improved automotive anti-skid control system in which an error of estimate of a vehicle speed based on a detected value of a wheel speed at a road wheel with a different-diameter tire such as a small-sized emergency tire is capable of being reduced to a minimum, even when the detected value of the wheel speed at the road wheel with the different-diameter tire is utilized for estimation of the vehicle speed required for derivation of a target wheel speed.

It is a further object of the invention to provide an improved automotive anti-skid control system in which the wheel-speed adjustment for the different-diameter road wheel as well as the wheel-speed adjustment for the usual-diameter road wheel can be performed accurately on the basis of a compensated pseudo vehicle speed estimated from a compensated wheel speed of the different-diameter road wheel with a different-diameter tire such as a small-sized emergency tire such that the wheel speed at the different-diameter road wheel as well as the wheel speed at the other road wheel with a usual tire is properly adjusted within a wheel-speed range adequate to satisfy the reference slip ratio.

It is a still further object of the invention to provide an improved automotive anti-skid control system which can assure both a steering effect on turns and a minimum possible braking distance even when temporarily installing a different-diameter tire such as a small-sized emergency tire.

In order to accomplish the aforementioned and other objects of the invention, an anti-skid control system for an automotive vehicle comprises sensor means for detecting a wheel speed of each road wheel of the vehicle, control means for controlling a wheel-brake cylinder pressure of each road wheel, compensation means for compensating a different-diameter wheel speed of a different-diameter road wheel with a small-sized tire in case that one of the road wheels is the different-diameter road wheel, and error rate calculation means for calculating an error rate of the different-diameter wheel speed with respect to the detected wheel speed of the other road wheel with a usual tire on the basis of a maximum wheel speed corresponding to the different-diameter wheel speed and the detected wheel speed of the other road wheel, except at least during anti-skid control. The compensation means compensates the different-diameter wheel speed by the error rate. A first calculation means is provided for deriving a compensated vehicle speed from the compensated different-diameter wheel speed, and a second calculation means is provided for deriving a slip ratio of the different-diameter road wheel from the compensated vehicle speed and the compensated different-diameter wheel speed and deriving a slip ratio of the other road wheel from the compensated vehicle speed and the detected wheel speed of the other road wheel. The control means controls each wheel-brake cylinder pressure so that the slip ratio is adjusted to a predetermined reference slip ratio.

According to another aspect of the invention, an anti-skid control system for an automotive vehicle, comprises sensor means for detecting a wheel speed of each road wheel of the vehicle, control means for controlling a wheel-brake cylinder pressure of each road wheel, compensation means for compensating a different-diameter wheel speed of a different-diameter road wheel with a small-sized tire in case that one of the road wheels is the different-diameter road wheel, diameter-difference ratio derivation means for deriving a rate of diameter-difference between an outside diameter of the different-diameter road wheel and an outside diameter of the other road wheel with a usual tire, on the basis of a maximum wheel speed corresponding to the different-diameter wheel speed and a second highest wheel speed of the wheel speeds detected by the sensor means, and error rate calculation means for calculating an error rate of the different-diameter wheel speed with respect to the detected wheel speed of the other road wheel, on the basis of the ratio of diameter-difference, except at least during anti-skid control. The compensation means compensates the different-diameter wheel speed by the error rate. A first calculation means is provided for deriving a compensated vehicle speed from the compensated different-diameter wheel speed, and a second calculation means is provided for deriving a slip ratio of the different-diameter road wheel from the compensated vehicle speed and the compensated different-diameter wheel speed and deriving a slip ratio of the other road wheel from the compensated vehicle speed and the detected wheel speed of the other road wheel. The control means controls each wheel-brake cylinder pressure so that the slip ratio is adjusted to a predetermined reference slip ratio.

According to a further aspect of the invention, an anti-skid control system for an automotive vehicle, comprises sensor means for detecting a wheel speed of each road wheel of the vehicle, control means for controlling a wheel-brake cylinder pressure of each road wheel to prevent deceleration slip during braking, compensation means for compensating a different-diameter wheel speed of a different-diameter road wheel with a small-sized tire in case that one of the road wheels is the different-diameter road wheel, diameter-difference ratio derivation means for deriving a ratio of diameter-difference between an outside diameter of the different-diameter road wheel and an outside diameter of the other road wheel with a usual tire, on the basis of a maximum wheel speed corresponding to the different-diameter wheel speed and a second highest wheel speed of the wheel speeds detected by the sensor means, and error rate calculation means for calculating an error rate of the different-diameter wheel speed with respect to the detected wheel speed of the other road wheel, on the basis of the ratio of diameter-difference, except at least during anti-skid control. The compensation means compensates the different-diameter wheel speed by the error rate. A first calculation means is provided for deriving a compensated pseudo vehicle speed from the compensated different-diameter wheel speed, and the second calculation means is provided for deriving a slip ratio of the different-diameter road wheel from the compensated pseudo vehicle speed and the compensated different-diameter wheel speed and deriving a slip ratio of the other road wheel from the compensated vehicle speed and the detected wheel speed of the other road wheel. The control means controls each wheel-brake cylinder pressure so that the slip ratio is adjusted to a predetermined reference slip ratio. The compensation means compensates the different-diameter wheel speed by the error rate under a particular condition in which, in absence of the anti-skid control, the ratio of diameter-difference is greater than a predetermined minimum ratio of diameter-difference corresponding to a threshold of a lower dead zone and less than a predetermined maximum ratio of diameter-difference corresponding to a threshold of an upper dead zone, for a predetermined first period of time or more.

The compensation means inhibits a compensation for the different-diameter wheel speed when the ratio of diameter-difference is less than or equal to a predetermined additional ratio of diameter-difference for a predetermined second period of time or more. The predetermined first period is set to be greater than the predetermined second period in order to quickly inhibit the compensation for the different-diameter wheel speed and to quickly recover the compensated different-diameter wheel speed to the detected different-diameter wheel speed, when the ratio of diameter-difference is less than or equal to the predetermined additional ratio of diameter-difference for the predetermined second period of time or more.

The compensation means includes filtering means for setting a modified amount in the error rate derived from the error rate calculation means every predetermined sampling time intervals at a preselected minute modified amount through a filtering process, to prevent a rapid change in the error rate when the error rate is adjusted towards a target value. The target value of the error rate is set at a difference between the rate of diameter-difference and the predetermined minimum ratio of diameter difference when the particular condition is satisfied. The target value of the error rate is set at zero when the ratio of diameter-difference is less than or equal to the predetermined additional ratio of diameter-difference for the predetermined second period of time.

The compensation means inhibits a new calculation of the error rate when the compensated pseudo vehicle speed from the first calculation means is less than a predetermined vehicle speed. The compensation means inhibits a new calculation of the error rate when a minimum wheel speed of the detected wheel speeds is less than a predetermined wheel speed correlated with the minimum ratio of diameter-difference.

BRIEF DESCRIPTION OF THE DRAWINGS

FIGS. 6(a) to 6(h) are timing charts illustrating several wave-forms which are utilized for the purpose of explanation of the operation of the anti-skid control system according to the invention.

DESCRIPTION OF THE PREFERRED EMBODIMENTS

Figure 1:
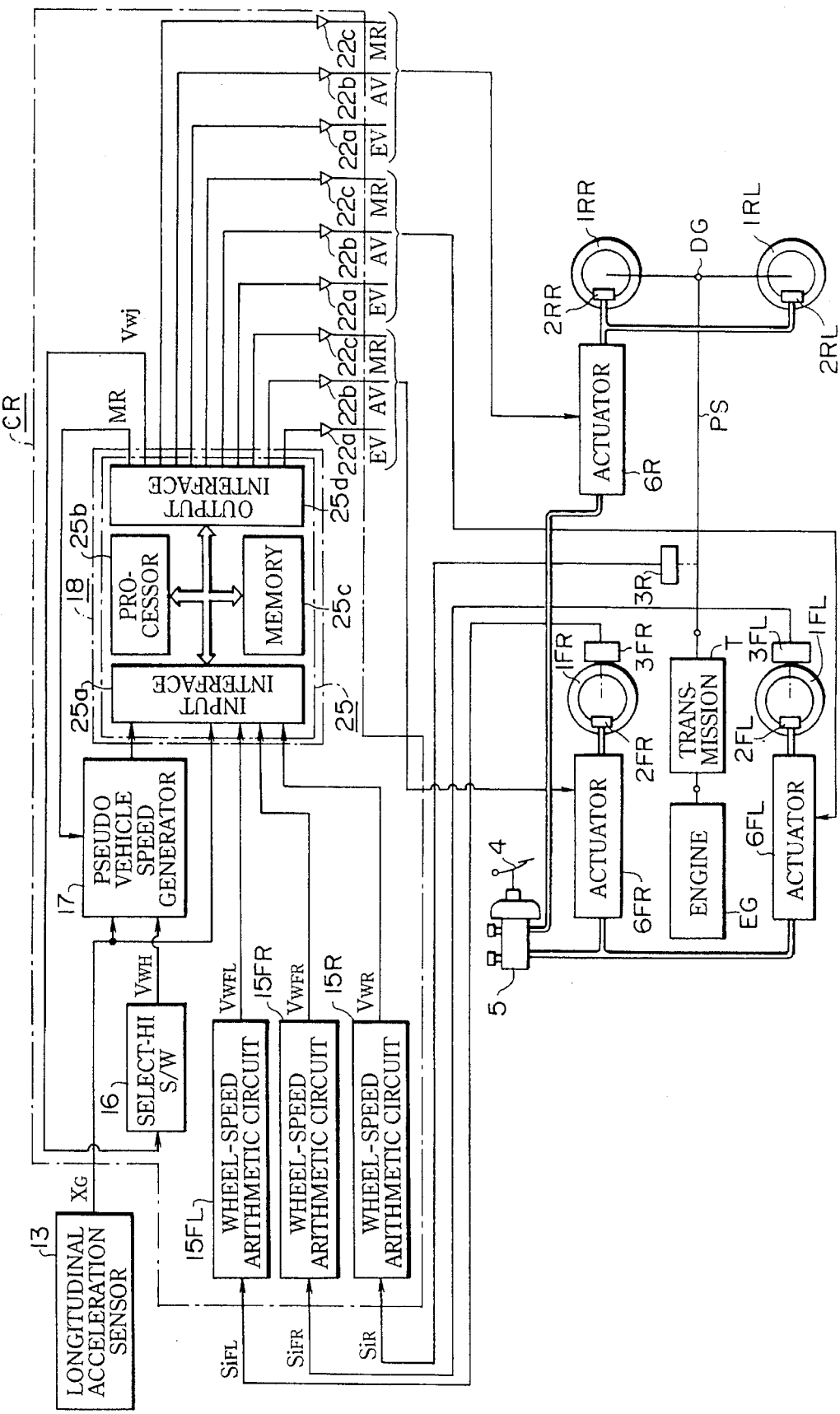
FIG. 1 is a block diagram illustrating one embodiment of an anti-skid control system according to the present invention.
Figure 2:
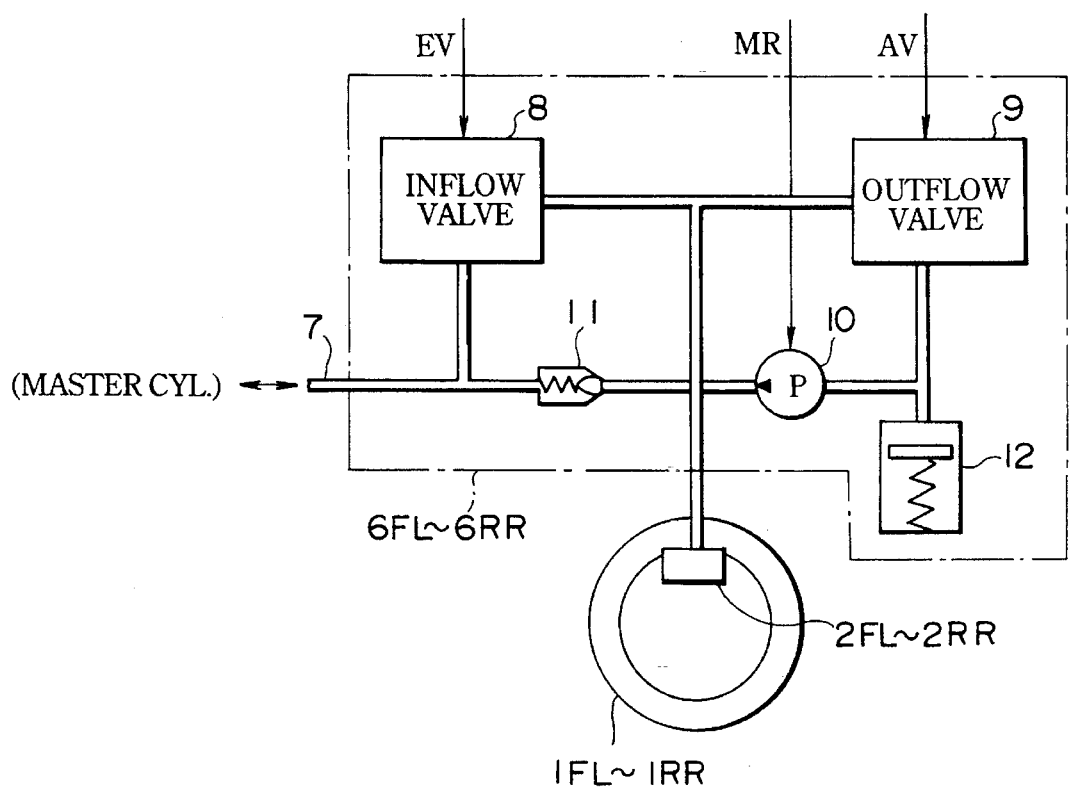
FIG. 2 is a hydraulic circuit diagram illustrating one embodiment of a hydraulic actuator incorporated in the anti-skid control system shown in FIG. 1.

Referring now to the drawings, particularly to FIGS. 1 to 5, the anti-skid control system of the invention is exemplified in case of a three-channel type anti-skid control system for a rear-wheel drive vehicle. As seen in FIG. 1, engine power produced by an engine EG is transmitted through a transmission T and a propeller shaft PS, and distributed to rear-left and rear-right drive wheels 1RL and 1RR by means of a rear differential DG. Reference numerals 1FL and 1FR denote a front-left driven wheel and a front-rear driven wheel, respectively. Wheel-brake cylinders 2FL, 2FR, 2RL and 2RR are provided at the road wheels 1FL, 1FR, 1RL and 1RR, respectively. Front-left and front-right wheel-speed sensors 3FL and 3FR are respectively provided at the front-left road wheel 1FL and the front-right road wheel 1FR, so as to generate a sinusoidal-wave signal S$i$FL indicative of the number of revolutions at the front-left road wheel 1FL and a sinusoidal-wave signal S$iFR$ indicative of the number of revolutions at the front-right road wheel 1FR. Additionally, a rear wheel-speed sensor 3R is provided at the propeller shaft PS so as to generate a sinusoidal-wave signal S$i$R indicative of a mean value of the number of revolutions detected at the rear-left road wheel 1RL and the number of revolutions detected at the rear-right road wheel 1RR. The front-left wheel-speed sensor 3FL, the front-right wheel-speed sensor 3FR, and the rear wheel-speed sensor 3R are connected to a front-left wheel-speed arithmetic circuit 15FL, a front-right wheel-speed arithmetic circuit 15FR and a rear wheel-speed arithmetic circuit 15R, respectively. These wheel-speed sensors construct wheel-speed detection means for the three-sensor, three-channel type anti-skid control system. Reference numeral 5 denotes a tandem master cylinder with two pistons, set in tandem. In the dual-brake system with the tandem master cylinder 5, a master cylinder pressure which pressure is developed by depression of a brake pedal 4 and generated from one port of the master cylinder is fed to the front-wheel side, while a master-cylinder pressure which pressure is developed by depression of the brake pedal 4 and generated from the other port of the master cylinder is fed to the rear-wheel side. In the front wheel brakes, the master-cylinder pressure from the one port is fed through a front-left wheel side hydraulic actuator 6FL to the front-left wheel-brake cylinder 2FL and also fed through a front-right wheel side hydraulic actuator 6FR to the front-right wheel-brake cylinder 2FR. Thus, the wheel-cylinder pressures in the front-left and front-right wheel-brake cylinders 2FL and 2FR can be regulated independently of each other, by means of the two hydraulic actuators 6FL and 6FR. On the other hand, in the rear wheel brakes, the master-cylinder pressure from the other port is fed through a sole rear wheel side hydraulic actuator 6R to both the rear-left and rear-right wheel-brake cylinders 2RL and 2RR. Thus, the wheel-cylinder pressures in the rear-left and rear-right wheel-brake cylinders 2RL and 2RR can be regulated in common with each other, by means of the sole hydraulic actuator 6R. As shown in FIG. 2, each of the actuators 6FL, 6FR and 6R includes an electromagnetic inflow valve 8 fluidly disposed between a hydraulic conduit 7 connected to the master cylinder 5 and the associated wheel-brake cylinder, an electromagnetic outflow valve 9 fluidly disposed in parallel with the inflow valve 8, an oil pump 10, a one-way check valve 11, and a pressure accumulator 12 fluidly disposed between the outlet port of the outflow valve 9 and the inlet port of the oil pump 10. The oil pump 10 serves as a return pump which returns the wheel-cylinder pressure towards the hydraulic conduit 7 in the pressure-reduction mode of the anti-skid control, while the pressure accumulator 12 is provided for temporarily accumulating a portion of the brake fluid pressure extracted from the wheel-brake cylinder during anti-skid control. The oil pump 10 and the check valve 11 are provided in series to each other and fluidly disposed between the inlet port of the inflow valve 8 and the outlet port of the outflow valve 9. In one exemplified hydraulic actuator shown in FIG. 2, although the oil pump 10 and the accumulator 12 are provided in one hydraulic actuator, the oil pump 10 and the accumulator 12 may be commonized in the respective actuators 6FL, 6FR and 6R. In case of commonization of both the oil pump 10 and the pressure accumulator 12, it will be appreciated that additional directional control valves are required for controlling inflow and outflow of brake fluid pressure to and from the pump 10 and the accumulator 12.

As seen in FIG. 1, a controller CR receives a longitudinal acceleration signal $X_G$ from a longitudinal acceleration sensor 13 attached to the vehicle body, in addition to the three sinusoidal-wave signals $S_{iFL}$, $S_{iFR}$ and $S_{iR}$, and then generates three fluid-pressure control signals EV, AV and MR. As best seen in FIG. 2, the fluid-pressure control signals EV, AV and MR are fed to each actuator, in such a manner as to control the inflow valve 8 by the signal EV, to control the outflow valve 9 by the signal AV, and to control the oil pump 10 by the signal MR. The longitudinal acceleration sensor 13 is provided for detecting an acceleration or a deceleration exerted on the vehicle body in the longitudinal direction of the vehicle. The longitudinal acceleration sensor 13 is so designed as to output null voltage in case that there is no longitudinal acceleration exerted on the vehicle body, and to output a positive voltage in case that there is a positive longitudinal acceleration acting on the vehicle body in the vehicle forward direction, and to output a negative voltage in case that there is a deceleration corresponding to a negative longitudinal acceleration acting on the vehicle body in the vehicle backward direction. The controller CR includes three wheel-speed arithmetic circuits 15FL, 15FR and 15R, respectively receiving the revolution-speed indicative sinusoidal-wave signals $S_{iFL}$, $S_{iFR}$ and $S_{iR}$ from the wheel-speed sensors 3FL, 3FR and 3R. The respective wheel-speed arithmetic circuits 15FL, 15FR and 15R derive a front-left wheel speed, a front-right wheel speed, and a rear wheel speed on the basis of the three sinusoidal-wave signals $S_{iFL}$, $S_{iFR}$ and $S_{iR}$ and the outside radius of each road wheel which is rotating, so as to generate a front-left wheel speed indicative signal $V_{wFL}$, a front-right wheel speed indicative signal $V_{wFR}$, and a rear wheel speed indicative signal $V_{wR}$ The wheel-speed indicative signals $V_{wFL}$, $V_{wFR}$ and $V_{wR}$ represent a peripheral speed at the front-left road wheel 1FL, a peripheral speed at the front-right road wheel 1FR, and a peripheral speed at the rear road wheels 1RL and 1RR, respectively. The derived wheel-speed indicative signals $V_{wFL}$, $V_{wFR}$ and $V_{wR}$ are supplied to an input interface 25a of a wheel-brake cylinder pressure control circuit 18 as hereinbelow described in detail and then these wheel-speed indicative signals are suitably compensated therein. The controller CR includes a select-HIGH switch 16 for selecting the highest one of the compensated wheel-speed indicative signals $V_{wj}$ (j=FL, FR, R) as a select-HIGH wheel speed indicative signal $V_{wH}$. The controller CR includes a pseudo vehicle speed generator 17 which receives the select-HIGH wheel speed indicative signal $V_{wH}$ and the longitudinal acceleration indicative signal $X_G$ and estimates or calculates a pseudo vehicle speed on the basis of these signals $V_{wH}$ and $X_G$ to produce a pseudo vehicle speed indicative signal $V_i$. The controller CR also includes the wheel-brake cylinder pressure control circuit 18 which circuit receives the longitudinal acceleration indicative signal $X_G$ from the longitudinal acceleration sensor 13, the pseudo vehicle speed indicative signal $V_i$ from the pseudo vehicle speed generator 17, and the wheel-speed indicative signals $V_{wFL}$, $V_{wFR}$ and $V_{wR}$ from the wheel-speed arithmetic circuits 15FL, 15FR and 15R, for the purpose of the anti-skid control executed during braking. As set out above, the wheel-brake cylinder pressure control circuit 18 suitably compensates the wheel-speed indicative signals $V_{wFL}$, $V_{wFR}$ and $V_{wR}$ to produce the compensated wheel-speed indicative signals $V_{wj}$. The output interface 25d of the wheel-brake cylinder pressure control circuit 18 outputs a plurality of control signals through three sets of drive circuits to the respective actuators 6FL, 6FR and 6R, so as to properly control the wheel-cylinder pressures at the respective wheel-brake cylinders 2FL, 2FR, 2RL and 2RR. As seen in FIG. 1, each drive-circuit set is constructed by three different drive circuits, namely a first drive circuit 22a provided for generating the fluid-pressure control signal EV to the inflow valve 8, a second drive circuit 22b provided for generating the fluid-pressure control signal AV to the outflow valve 9, and a third drive circuit 22c provided for generating the fluid-pressure control signal MR to the oil pump 10. Since the fluid-pressure control signal MR is set at a binary "1" only when the anti-skid control system comes into operation, the control signal MR can be referred to as an "anti-skid control system operating-state indicative signal" which will be hereinafter abbreviated to an "ABS operating-state indicative signal". In the embodiment, for the purpose of calculating or deriving the wheel-speeds $V_{wFL}$, $V_{wFR}$ and $V_{wR}$ by means of the wheel-speed arithmetic circuits 15FL to 15R, the nominal outside radius of the usual tire which tire is initially installed on the vehicle, is used as the outside radius of each road wheel which is rotating. As hereinafter explained in more detail, each of the front-wheel side wheel-speed sensors 3FL and 3FR has a serrated gear teeth formed on the outer periphery of the brake disk, while the rear-wheel side wheel-speed sensor 3R has a serrated gear teeth formed on a disk fixedly connected to the outer periphery of the propeller shaft PS. Rotation of each disk causes changes in magnetic field strength of a coil opposing the serrated gear. The changes in magnetic field strength of the coil can be detected as changes in voltage such as the above-noted sinusoidal-wave voltage signals SiFL, SiFR and SiR. The respective wheel-speed arithmetic circuit 15FL to 15R operates to waveform-shape from the sinusoidal-wave voltage signal to a substantially rectangular pulse signal, and to derive an angular velocity of the brake disk assembled in the left-hand side front axle, an angular velocity of the brake disk assembled in the right-hand side front axle, and an angular velocity of the disk attached to the propeller shaft, on the basis of the number of pulses included in the waveform-shaped pulse signal per a unit hour and the outside radii of the respective disks. Then, the wheel-speed arithmetic circuit 15FL derives the front-left wheel speed at the front-left road wheel 1FL with the usual tire by multiplying the derived angular velocity of the front-left brake drum included in the front axle assembly by the nominal outside radius of the usual tire. The wheel-speed arithmetic circuit 15FR derives the front-right wheel speed at the front-right road wheel 1FR with the usual tire by multiplying the derived angular velocity of the front-right brake drum included in the front axle assembly by the nominal outside radius of the usual tire. The wheel-speed arithmetic circuit 15R derives the rear wheel speed at the rear road wheels 1RL and 1RR with the usual tire by multiplying the derived angular velocity of the propeller shaft PS by the nominal outside radius of the usual tire.

The pseudo vehicle speed generator 17 which is employed in the anti-skid control system of the invention, has the same construction as a pseudo vehicle speed generator which has been disclosed in the Japanese Patent Provisional Publication (Tokkai Heisei) No. 4-27650. The construction of the pseudo vehicle speed generator 17 hereinbelow explained in brief.

The pseudo vehicle speed generator 17 receives the longitudinal acceleration indicative signal XG from the sensor 13 and the ABS operating-state indicative signal MR representing whether or not the anti-skid control system comes into operation. In the event that a logical value of the ABS operating-state indicative signal MR is a binary "1", the pseudo vehicle speed generator 17 operates to set the select-HIGH wheel-speed indicative signal VwH selected by the select-HIGH switch 16 as the initial value of the vehicle speed at the rise time point of the ABS operating-state indicative signal MR, and to temporarily derive a pseudo vehicle speed Vi by adding the integral of the longitudinal-acceleration indicative signal value XG to the initial value (VwH) of the vehicle speed.

On the basis of each of the wheel-speed indicative signal values VwFL, VwFR and VwR, and the pseudo vehicle speed indicative signal value Vi, the wheel-brake cylinder pressure control circuit 18 controls all the actuators 6FL, 6FR and 6R which adjust the brake-fluid pressures in the respective wheel-brake cylinders 2FL, 2FR, 2RL and 2RR. As seen in FIG. 1, the wheel-brake cylinder pressure control circuit 18 comprises a microcomputer 25 including at least the input interface 25a having an analogue-to-digital conversion function, the output interface 25d having a digital-to-analogue conversion function, an arithmetic processor 25b, and a memory 25c. The wheel-brake cylinder pressure control circuit 18 derives the slip ratio of each road wheel on the basis of the wheel-speed indicative signal values Vwj (j=FL, FR, R) and the pseudo vehicle speed indicative signal value Vi. The pressure control circuit 18 also functions to derive a positive and negative acceleration/deceleration indicative signal V'wj at each road wheel which signal V'wj is obtained by differentiating the wheel-speed indicative signal value Vwj at each road wheel. The positive and negative acceleration/deceleration indicative signal V'wj will be hereinafter referred to as a "wheel acceleration/deceleration indicative signal". The pressure control circuit 18 compares a calculated value of the slip ratio at each road wheel with a reference slip ratio Sjo (j=FL, FR, R) of each road wheel which reference slip ratio is preselected in consideration of both a wheel-cylinder pressure build-up timing and a wheel-cylinder pressure-reduction timing. The pressure control circuit 18 compares the derived wheel acceleration/deceleration indicative signal V'wj with a predetermined negative threshold α for a deceleration of the road wheel which deceleration corresponds to an angular deceleration of the road wheel, or with a predetermined positive threshold β for an acceleration of the road wheel which acceleration corresponds to an angular acceleration of the road wheel. In other words, the negative threshold α corresponds substantially to a threshold necessary for the pressure-reduction start timing, while the positive threshold β corresponds substantially to a threshold necessary for the pressure build-up start timing. In more detail, the negative threshold α is used as a threshold necessary for shifting from a rapid pressure build-up mode or a moderate pressure build-up mode to a high-pressure hold mode, while the positive threshold β is used as a threshold necessary for shifting from a pressure-reduction mode to a low-pressure hold mode. On the basis of the above-noted comparison results, the pressure control circuit 18 properly controls the wheel-cylinder pressure at the respective wheel-brake cylinder 2FL, 2FR, 2RL and 2RR, by selecting one of five pressure control modes, namely a rapid pressure build-up mode at which the wheel-cylinder pressure is rapidly increased, a high-pressure hold mode at which the wheel-cylinder pressure is held constant at a high-pressure level, a low-pressure hold mode at which the wheel-cylinder pressure is held constant at a low-pressure level, a pressure reduction mode at which the wheel-cylinder pressure is reduced, and a moderate pressure build-up mode at which the wheel-cylinder pressure is moderately increased, and by adjusting the wheel-cylinder pressure in accordance with the selected mode. As appreciated from the above, the anti-skid control executed by the anti-skid control system of the present invention is directed essentially to an anti-skid brake control according to which the wheel-brake cylinder pressure can be properly controlled.

The arithmetic operation of the microcomputer 25 employed in the anti-skid brake control system of the embodiment will be hereinbelow described in detail in accordance, with both the flow chart illustrated in FIG. 3 and the characteristic curve (see FIG. 4) based on the wheel-cylinder pressure control executed by the system of the embodiment. The wheel-cylinder pressure control procedure is executed as time-triggered interrupt routines to be triggered every predetermined sampling time intervals ΔT such as 5 msec.

Figure 3:
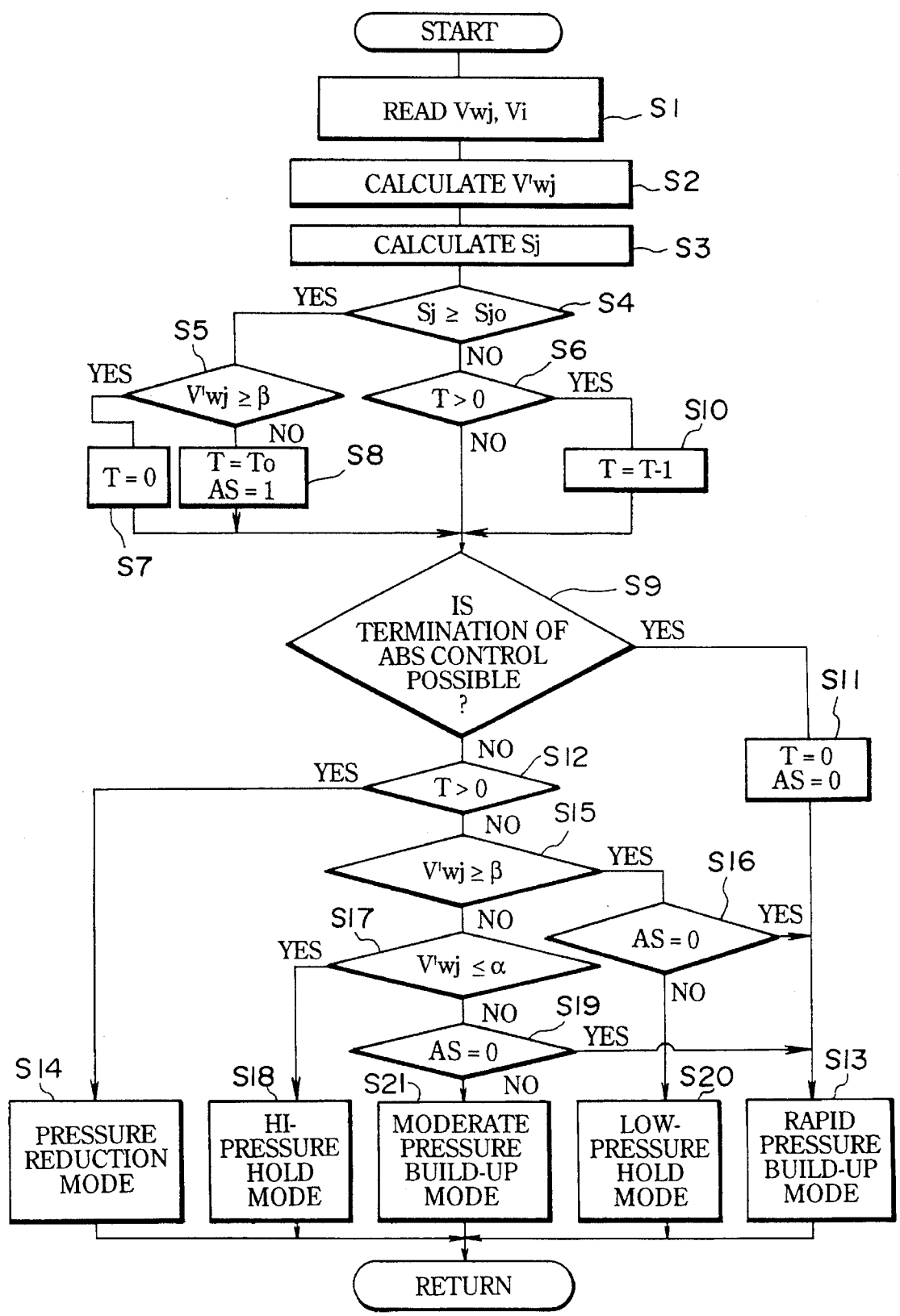
FIG. 3 is a flow chart illustrating an anti-skid brake control flow executed by a wheel-brake cylinder pressure control circuit included in the anti-skid control system shown in FIG. 1.

In FIG. 3, AS denotes an anti-skid control flag, while T denotes an elapsed time recorded by a pressure-reduction timer or a value counted by the timer. The anti-skid control flag AS and the elapsed time or counted value T of the timer are reset to "0" through the flow from step S9 to step S11, when the ignition key switch is turned ON or when the anti-skid control is terminated. While the anti-skid control flag AS is set at "1", the ABS operating-state indicative signal MR having the logical value "1" is output to the pseudo vehicle speed generator 17.

Referring now to FIG. 3, in step S1, the pseudo vehicle speed indicative signal Vi from the pseudo vehicle speed generator 17 and current values of the wheel-speed indicative signal values Vwj (j=FL, FR, R) from the respective wheel-speed arithmetic circuits 15j (j=FL, FR, R) or the compensated wheel-speed indicative signal value VwjC from the wheel-brake cylinder pressure control circuit 18 are read out or derived.

In step S2, a change in a wheel-speed per unit hour, i.e., the wheel acceleration/deceleration indicative signal value V'wj is calculated by subtracting the current wheel-speed indicative signal value VwjN read-out at step S1 from the previous wheel-speed indicative signal value Vwj(N−1) read-out at the control procedure prior to the current control procedure. The calculated wheel acceleration/deceleration indicative signal value V'wj is stored in a predetermined memory address of the memory 25c.

In step S3, the slip ratio Sj of each road wheel is calculated in accordance with the following expression (1).

$$Sj = \{(Vi - Vwj)/Vi\} \cdot 100(\%) \quad (1)$$

In step S4, a test is made to determine whether the respective slip ratio Sj calculated at step S3 is greater than or equal to the preselected reference slip ratio Sjo. When the answer to step S4 is affirmative (YES), that is, when the calculated slip ratio Sj is greater than or equal to the reference slip ratio Sjo, the procedure shifts to step S5. On the other hand, when the answer to step S4 is negative (NO), that is, when the calculated slip ratio Sj is less than the reference slip ratio Sjo, the procedure flows to step S6.

In step S5, a test is made to determine whether each wheel acceleration/deceleration indicative signal value V'wj calculated at step S2 is greater than or equal to the predetermined positive threshold β of the angular acceleration of the road wheel. When the answer to step S5 is affirmative (YES), i.e., when the calculated wheel acceleration/deceleration indicative signal value V'wj is above the predetermined positive threshold β, the procedure flows from step S5 to step S7 at which the value T of the pressure-reduction timer is reset to "0". Then, the procedure flows from step S7 to step S9. In contrast, when the answer to step S5 is negative (NO), i.e., when the calculated wheel acceleration/deceleration indicative signal value V'wj is below the predetermined positive threshold β, the procedure flows from step S5 to step S8 at which the value T of the pressure-reduction timer is set at a predetermined time To and at the same time the anti-skid control flag AS is set at a binary "1". Thereafter, step 9 proceeds.

At step S6, a test is made to determine whether the value T of the pressure-reduction timer exceeds zero. When the answer to step S6 is affirmative, i.e., when the value T exceeds zero, step S10 proceeds at which the value T of the timer is updated by a value (T−1) which is obtained by subtracting a value "1" from the current value T of the timer. The updated value (T−1) of the timer is stored in the memory 25c and then the procedure flows to step S9. At step S9, a decision is made to determine whether the anti-skid control can be terminated or not. In case that termination of the anti-skid control is possible, step S11 proceeds at which the value T of the timer is reset to "0" and additionally the anti-skid control flag AS is reset to a binary "0". After step S11, the procedure flows to step S13. On the other hand, in case that termination of the anti-skid control is impossible, step S12 proceeds at which a test is made to determine whether the value T of the timer exceeds zero. When the answer to step S12 is affirmative, i.e., when the value T of the timer is greater than zero, the procedure enters step 14. In contrast to the above, when the answer to step S12 is negative, i.e., when the value T of the timer is less than or equal to zero, the procedure flows to step S15 at which a test is made in the same manner as step S5. When the answer to step S15 is affirmative, i.e., when the calculated wheel acceleration/deceleration indicative signal value V'wj is above the predetermined positive threshold β, step S16 enters at which a test is made to determine whether the anti-skid control flag AS is reset at a binary "0". When the answer to step S16 is affirmative (YES), the procedure flows to step S13. In contrast, when the answer to step S16 is negative (NO), the procedure flows to step S20. On the other hand, when the answer to step S15 is negative, i.e., when the calculated wheel acceleration/deceleration indicative signal value V'wj is below the predetermined positive threshold β, step S17 proceeds at which a test is made to determine whether or not the calculated wheel acceleration/deceleration indicative signal value V'wj is less than or equal to the predetermined negative threshold α. When the answer to step S17 is affirmative, i.e., when the calculated wheel acceleration/deceleration indicative signal value V'wj is less than or equal to the predetermined negative threshold or, the procedure flows to step S18. When the answer to step S17 is negative, i.e., when the calculated wheel acceleration/deceleration indicative signal value V'wj is greater than the predetermined negative threshold α, the procedure flows to step S19 at which a test is made in the same manner as step S16. At step S19, when the anti-skid control flag AS is reset at a binary "0", step S13 proceeds. When the anti-skid control flag AS is not reset at a binary "0" at step S19, step S21 proceeds.

At step S13, the control mode for the wheel-cylinder pressure of at least one road wheel, which wheel is under the anti-skid control, is set at the rapid pressure build-up mode. At step S14, the control mode for the wheel-cylinder pressure of at least one road wheel, subjected to the anti-skid control, is set at the pressure-reduction mode. At step S18, the control mode for the wheel-cylinder pressure of at least one road wheel, subjected to the anti-skid control, is set at the high-pressure hold mode. At step S20, the control mode for the wheel-cylinder pressure of at least one road wheel, subjected to the anti-skid control, is set at the low-pressure hold mode. At step S21, the control mode for the wheel-cylinder pressure of at least one road wheel, subjected to the anti-skid control, is set at the moderate pressure build-up mode. After each of steps S13, S14, S18, S20 and S21, the main program is returned.

Figure 4:
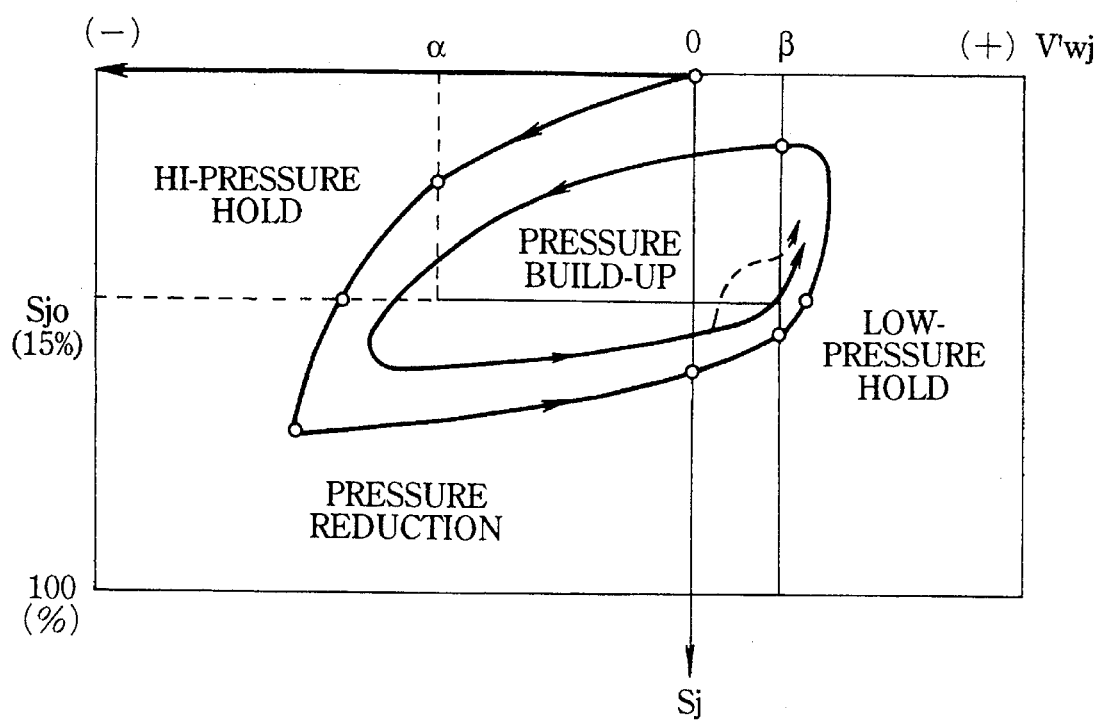
FIG. 4 is an explanatory view illustrating a control pattern of a wheel-cylinder pressure control executed by the wheel-brake cylinder pressure control circuit shown in FIG. 3.

Referring now to FIG. 4, there is shown the wheel-brake cylinder pressure controlling operation executed by the system of the embodiment in the form of a characteristic curve indicating the relationship between the calculated wheel speed indicative signal value V'wj and the calculated slip ratio Sj. As seen in FIG. 4, in the embodiment, the reference slip ratio Sjo memorized in the microcomputer 25 is set at 15% in consideration of both a superior steering effect and a shorter braking distance. In the event that the calculated slip ratio Sj is less than the reference slip ratio Sjo, the anti-skid control flag AS and the value T of the timer are both set at "0", and additionally the calculated wheel acceleration/deceleration indicative signal value V'wj is greater than the predetermined negative threshold $\alpha$ and less than predetermined positive threshold $\beta$, i.e., $\alpha<V'wj<\beta$, under such conditions as the beginning of braking or non braking, the control procedure flows from step S9 via step S11 to step S13, or flows from step S9 through steps S12, S15, S17 and S19 to step S13, or flows from step S9 through steps S12, S15 and S16 to step S13. In this case, at step S13, the pressure control mode for the respective actuator 6FL, 6FR and 6R is set at the rapid pressure build-up mode so that the wheel-cylinder pressure can be adjusted in accordance with the magnitude of the master-cylinder pressure produced by the master cylinder 5. In the above-noted rapid pressure build-up mode, the control signals EV and AV fed to the respective actuator 6FL, 6FR and 6R are both set at a logical value "0". As a result, the inflow valve 8 is controlled at its valve open state, while the outflow valve 9 is controlled at its valve closed state. As appreciated from the above, preferably the inflow valve 8 consists of a normally-open type electromagnetic valve, while the outflow valve 9 consists of a normally-closed type electromagnetic valve. When shifting from the above-noted non braking state or the beginning of braking to a brake-application state, the wheel-speed indicative signal value Vwj of the respective road wheel gradually decreases, and additionally the wheel acceleration/deceleration indicative signal value V'wj decreases to the negative direction corresponding to the direction of the increase in the angular deceleration of the road wheel, as seen in the uppermost portion of the characteristic curve located within the substantially upper central zone of FIG. 4. In accordance with the decrease in the wheel acceleration/deceleration indicative signal value V'wj, when the wheel acceleration/deceleration indicative signal value V'wj becomes below the predetermined negative threshold $\alpha$, the control procedure executed by the microcomputer 25 shifts from step S17 to step S18. Thus, the pressure control mode is set at the high-pressure hold mode at which the wheel-cylinder pressure is held constant at a comparatively high pressure level. In the high-pressure hold mode, the inflow valve 8 is maintained at its valve closed state with the control signal EV having the logical value "1", while the outflow valve 9 is maintained at its valve closed state with the control signal AV having the logical value "0". Under this condition in which the control mode is set at the high-pressure hold mode during braking, since the brakes are still applied to the road wheels, the wheel acceleration/deceleration indicative signal value V'wj is gradually reduced. Due to the reduction of the wheel acceleration/deceleration indicative signal value V'wj, the slip ratio Sj increases. Thereafter, when the slip ratio Sj exceeds the preselected reference slip ratio Sjo with the wheel acceleration/deceleration indicative signal value V'wj less than the positive threshold $\beta$, the control procedure flows from step S4 through step S5 to step S8 at which the value T of the pressure-reduction timer is set at the predetermined value To and additionally the anti-skid control flag AS is set at a binary "1". Upon the control flag AS is set at "1", the wheel-brake cylinder pressure control circuit 18 outputs the ABS operating-state indicative signal MR to the respective hydraulic actuator 6FL, 6FR and 6R, with the result that the return pump 10 is conditioned in its operative state. In this case, the procedure flows from step S8 through steps S9 and S12 to step S14 at which the pressure control mode is set at the pressure-reduction mode wherein the wheel-cylinder pressure is returned from the fully opened outflow valve 9 through the return pump 10 and the check valve 11 to the master-cylinder side in such a manner as to reduce the wheel-cylinder pressure. According to the pressure-reduction mode as seen in the left-hand side lower portion of the characteristic curve of FIG. 4, although the braking force applied to the road wheels is also reduced, the reduction of the wheel-speed indicative signal value Vwj continues for a while. As a result, the decrease in the wheel acceleration/deceleration indicative signal value V'wj continues for a moment, while the slip ratio Sj further increases, as seen in the characteristic curve within the left-hand side lower zone of FIG. 4. Thereafter, the state of the road wheel is gradually shifted from its deceleration state to its acceleration state, as the rate of decrease in the wheel-speed indicative signal value Vwj decreases. Owing to shifting towards the acceleration state of the road wheel, the wheel acceleration/deceleration indicative signal value V'wj also increases to the positive direction corresponding to the direction of the increase in the angular acceleration of the road wheel. Thereafter, upon the wheel acceleration/deceleration indicative signal value V'wj exceeds the predetermined positive threshold $\beta$, the control procedure flows from step S4 through step S5 to step S7 at which the value T of the timer is reset at "0". Then, the procedure flows from step S7 to step S12 via step S9. At step S12, since the value T is "0", the procedure flows to step S15, and then the procedure flows to step S16 because of $V'wj \leq \beta$. At step S16, since the anti-skid control signal AS is set at "1", the control flow shifts from step S16 to step S20. At step 20, the brake-fluid pressure in the wheel-brake cylinder associated with the hydraulic actuator which is controlled according to the anti-skid brake control, is adjusted according to the low-pressure hold mode. At the low-pressure hold mode, the wheel-cylinder pressure is held constant at a comparatively low pressure level with the inflow valve 8 conditioned in the closed state due to the control signal EV of the logical value "1" and with the outflow valve 9 conditioned in the closed state due to the control signal AV of the logical value "0". In the low-pressure hold mode shown in the right-hand side zone of FIG. 4, since the brakes are continuously applied to the road wheels, the rate of increase in the wheel-speed indicative signal value Vwj tends to be gradually decreased. In accordance with the decrease in the rate of increase in the wheel-speed indicative signal value Vwj, when the wheel acceleration/deceleration indicative signal value V'wj becomes less than the predetermined positive threshold $\beta$, the procedure flows from step S15 to step S17. The flow shifts from step S17 to step S19, since the wheel acceleration/deceleration indicative signal value V'wj is still greater than the predetermined negative threshold $\alpha$. Thereafter, since the anti-skid control flag AS is still maintained at "0", the procedure is transferred from step S19 to step S21. At step 21, in order to provide the moderate pressure build-up mode, the master-cylinder pressure produced by the master cylinder 5 is intermittently fed to the wheel-brake cylinder whose brake-fluid pressure is controlled in accordance with the anti-skid control, with the result that the wheel-cylinder pressure is moderately increased in a stepwise manner. In the moderate pressure build-up mode, the logical value of the control signal EV for the inflow valve 8 is repeatedly changed from one of the two logical values "0" and "1" to the other, for a predetermined period of time. On the other hand, the logical value of the control signal AV for the outflow valve 9 is maintained at "0", so as to keep the outflow valve 9 closed. In this manner, the wheel-cylinder pressure of the road wheel, which is subjected to the anti-skid control, is gradually increased in a stepwise manner. As seen in the uppermost portion of the characteristic curve within the upper central zone of FIG. 4, the braking force applied to the road wheels increases gradually according to the moderate increase in the wheel-cylinder pressure in the moderate pressure build-up mode. As a result, the wheel acceleration/deceleration indicative signal value V'wj varies in the direction of the increase of the angular deceleration exerted on the road wheel. When the wheel acceleration/deceleration indicative signal value V'wj becomes less than the predetermined negative threshold α, the procedure flows from step S17 to step S18. The pressure control mode is set again at the high-pressure hold mode, as seen in a slight portion of the characteristic curve within the left-hand side upper zone of FIG. 4. Thereafter, when the slip ratio Sj becomes greater than the reference slip ratio Sjo, the procedure flows from step S4 through steps S5, S8, S9 and S12 to step S14 and thus the pressure control mode is set again at the pressure-reduction mode. In this manner, the low-pressure hold mode, the moderate pressure build-up mode, the high-pressure hold mode and the pressure-reduction mode are repeatedly executed in that order, in a manner so as to adjust the slip ratio Sj toward the reference slip ratio Sjo, and whereby a desired anti-skid effect is assured. When the vehicle speed is reduced considerably according to the anti-skid control during braking, the slip ratio Sj often reaches a value less than the reference slip ratio Sjo at the pressure-reduction mode. In this case, the procedure is transferred from step S4 to step S6. At step S6, since the value T of the timer has been already set at the predetermined value To at step S8 in setting of the pressure-reduction mode, the procedure flows from step S6 to step S10 at which the value T of the timer is set at the value (T−1). Thereafter, step S9 enters. As appreciated, the value T of the timer reaches "0", by repeating the above-noted shifting process from step S6 to step S10. Owing to repetition of shifting from step S6 to step S10, upon the value T of the timer reaches zero, the procedure is shifted from step S9 through steps S12, S15, S17 and S19 to step S21 at which the wheel-cylinder pressure is adjusted according to the moderate pressure build-up mode. As set forth above, subsequently to the moderate pressure build-up mode, the high-pressure hold mode is executed and thereafter the pressure-reduction mode is executed. Resultingly, the anti-skid brake control can be performed as indicated by the broken line of the characteristic curve of FIG. 4.

In the event that a particular condition necessary for termination of the anti-skid control is satisfied, such as when the vehicle speed is reduced to a considerably low speed slightly greater than 0, i.e., when the vehicle is conditioned substantially in its stopping state, or when the number of selection of the moderate pressure build-up mode is above a predetermined number, at step S9, the microcomputer 25 employed in the wheel-brake cylinder pressure control circuit 18 determines that the necessary condition for termination of the anti-skid control is satisfied. Thus, the procedure is shifted from step S9 to step S11 at which the value T of the timer is reset to "0" and the anti-skid control flag AS is also reset to "0". Thereafter, step S13 proceeds at which the rapid pressure build-up mode is selected. After selection of the rapid pressure build-up mode, the anti-skid control terminates.

As previously noted, the microcomputer 25 employed in the wheel-brake cylinder pressure control circuit 18 performs arithmetic processing necessary for compensation for the wheel-speed indicative signal values VwFL, VwFR and VwR, from the respective wheel-speed arithmetic circuits 15j, in order to approach or correct a signal value of the pseudo vehicle speed indicative signal Vi produced by the pseudo vehicle-speed generator 17 to a value essentially equivalent to the actual vehicle speed, and to assure both a steering effect on turns and a shorter braking distance by way of provision of maximum braking, while preventing the road wheels from excessively skidding or locking up. Note that the above-noted compensation for the wheel-speed indicative signal values is made to correct a particular wheel-speed indicative signal value detected at the different-diameter road wheel installing a comparatively small-sized tire such as a small-sized emergency tire to a value essentially equivalent to the true or actual wheel speed of the different-diameter road wheel with the small-sized tire, in case that the small-sized tire is installed in place of the punctured usual tire for instance. Therefore, the compensated wheel speed VwjC produced by the microcomputer 25 must be used for the anti-skid control procedure shown in FIG. 3 and for the pseudo vehicle-speed arithmetic processing of the pseudo vehicle-speed generator 17, in the presence of demands for the above-noted wheel-speed compensation. In the embodiment, in case that the small-sized tire such as an emergency tire (a so-called temper tire) is installed, the compensated wheel speed is used for deriving a compensated pseudo vehicle speed as explained later.

The fundamental principle of compensation for the wheel speed will be hereinbelow explained in detail.

As previously described, since the respective wheel-speed arithmetic circuits 15j (j=FL, FR, R) derive the wheel-speed indicative signals Vwj by multiplying each of the angular velocity of the front-left brake drum assembled in the front axle assembly, the angular velocity of the front-right brake drum assembled in the front axle assembly and the angular velocity of the drum attached to the propeller shaft by the nominal outside radius of the usual tire, in case that a small-sized tire such as an emergency tire is installed, the angular velocity of the road wheel with the small-sized tire becomes greater than that of the road wheel with the usual tire during straight-ahead driving on high-μ roads such as dry pavements, for example. In this case, a wheel speed obtained by multiplying the angular velocity of the road wheel with the small-sized tire by the nominal outside radius of the usual tire, is greater than an actual wheel speed of the different-diameter road wheel with the small-sized tire which actual wheel speed is obtained by multiplying the angular velocity of the different-diameter road wheel by the outside radius of the small-sized tire. The wheel speed obtained by multiplying the angular velocity of the road wheel with the small-sized tire by the nominal outside radius of the usual tire, will be hereinafter referred to as an "erroneous different-diameter wheel speed". The respective wheel-speed arithmetic circuits 15FL, 15FR and 15R as well as the respective wheel-speed sensors 3FL, 3FR and 3R never have both the function necessary to decide whether or not the road wheel with the small-sized tire is installed and the function necessary to compensate the ratio of the outside diameter or outside radius of the different-diameter tire to the usual tire. Thus, the signal value of the erroneous different-diameter wheel speed detected at the different-diameter road wheel having the small-sized tire becomes remarkably great, as compared with the wheel-speed indicative signal values at the other road wheels having the usual tire. Supposing the wheel-speed indicative signals Vwj including the above-noted erroneous different-diameter wheel speed indicative signal are fed to the select-HIGH switch 16, the select-HIGH switch selects the erroneous different-diameter wheel speed indicative signal value as the highest one (the select-HIGH wheel speed VwH) of the wheel-speed indicative signal values. Necessarily, the pseudo vehicle speed Vi which is produced by the pseudo vehicle speed generator 17 and based on the select-HIGH wheel speed VwH essentially equal to the erroneous different-diameter wheel speed indicative signal value, will become greater than the actual vehicle speed. The slip ratio Sj of each road wheel with the usual tire which slip ratio can be calculated in accordance with the above-noted expression (1), utilizing the erroneous pseudo vehicle speed Vi greater than the actual vehicle speed, will also become greater than a slip ratio based on the actual vehicle speed. In this case, there is a greatly increased tendency for the calculated value of the slip ratio Sj based on the erroneous different-diameter wheel speed indicative signal value to exceed the preselected reference slip ratio Sjo easily. Then, the anti-skid control procedure shown in FIG. 3 flows from step S4 through steps S8, S9 and S12 to step S14, so as to shift the pressure control mode to the pressure-reduction mode. Consequently, the pressure-reduction start timing of the anti-skid control, i.e., the shift timing to the pressure-reduction mode may be advanced. The tendency of the advanced pressure-reduction start timing is continued except in case that the erroneous different-diameter wheel speed indicative signal value is properly compensated. Owing to the advanced shift timing to the pressure-reduction mode, a braking force applied at least to the road wheel with the usual tire tends to become smaller than a desired braking force which will be adjusted on the basis of the actual vehicle speed. This may result in an undesirable longer braking distance. On the other hand, in case that the slip ratio Sj based on the erroneous different-diameter wheel speed indicative signal value is utilized for the brake-fluid pressure control of the wheel-brake cylinder incorporated in the different-diameter road wheel, this wheel-cylinder pressure control executed for the different-diameter road wheel may be executed at a suitable pressure-reduction start timing, since the ratio of the angular velocity of the different-diameter road wheel to the angular velocity of the road wheel with the usual tire is essentially identical to the ratio of the pseudo vehicle speed indicative signal value Vi based on the erroneous different-diameter wheel speed indicative signal value to the actual vehicle speed and thus the calculated value of the slip ratio Sj contains an erroneous component suitable to the different-diameter road wheel rather than the road wheel with the usual tire. To avoid the above-noted inconvenience, the system of the embodiment suitably compensates the different-diameter wheel speed which will be selected as the maximum wheel speed, as explained later.

In the system of the embodiment, under a condition wherein there are less fluctuations in wheel speed of respective road wheels, the ratio (Vwmax−Vw2nd)/Vw2nd of the deviation (Vwmax−Vw2nd) between the maximum wheel speed Vwmax and the second highest wheel speed Vw2nd to the second highest wheel speed Vw2nd is calculated as a ratio $\epsilon$ of the difference between the outside diameter of the road wheel having the maximum wheel speed Vwmax and the outside diameter of the road wheel having the second highest wheel speed Vw2nd. Note that the maximum wheel speed Vwmax is different from the select-HIGH wheel speed VwH which is produced through the select-HIGH process of the switch 16, as appreciated later. The ratio $\epsilon$ of the outside-diameter difference will be hereinafter referred to as a "diameter-difference ratio". In the event that the diameter-difference ratio $\epsilon$ is below a predetermined minimum diameter-difference ratio $\epsilon_{LO}$, such a small diameter-difference ratio $\epsilon$ may be negligible because the excessively small ratio $\epsilon$ has less influence on the anti-skid brake control, namely the timing of the wheel-cylinder pressure reduction and the timing of the pressure build-up. For instance, calculated as an error rate $\Delta K$ for the difference of the outside diameter, is a value which is obtained by subtracting the minimum diameter-difference ratio $\epsilon_{LO}$ from the diameter-difference ratio $\epsilon$. A different-diameter wheel speed of the different-diameter road wheel with the small-sized tire is derived or calculated as the product $(1-\Delta K)$Vwmax obtained by multiplying the maximum wheel speed Vwmax by a value $(1-\Delta K)$ obtained by subtraction of 1 and the error rate $\Delta K$. In order to enhance the accuracy of calculation of the above-noted error rate $\Delta K$, this calculation is not executed during anti-skid control, i.e., when the anti-skid control flag AS is set at "1" in the arithmetic processing shown in FIG. 3, since the anti-skid control produces positive and negative fluctuations in the wheel speed owing to repetition of the pressure-reduction and the pressure build-up. During anti-skid control, a wheel speed of the different-diameter road wheel with the small-sized tire is derived or calculated on the basis of the previously calculated error rate $\Delta K$. That is a new calculation for the error rate $\Delta K$ is not executed during the anti-skid control. In this manner, the maximum wheel speed Vwmax is properly compensated to derive a more precise different-diameter wheel speed essentially equivalent to the actual different-diameter wheel speed.

On actual vehicle driving, even when all road wheels are equipped with usual tires, the respective wheel speeds tend to fluctuate, owing to various factors, namely undulations of roads, a difference in road level, bouncing phenomena occurring due to the undulations or road-level difference, turning, meandering, or acceleration slip produced by excessive driving torque applied to drive wheels. In particular, during acceleration slip wherein the rear drive-wheels 1RL and 1RR are slipping due to excessive driving torque, the wheel speed VwR of the rear drive-wheels 1RL and 1RR becomes considerably greater than the wheel speeds VwFL and VwFR of the front wheels 1FL and 1FR. Such an unstable condition of the wheel speed continues for a while until the acceleration slip ends. On the other hand, under a stable condition of the wheel speed wherein there are less fluctuations in the wheel speed of each road wheel, the maximum wheel speed Vwmax which will be detected at the different-diameter road wheel with the small-sized tire remains remarkably greater than the second highest wheel speed Vw2nd. In view of the above, in order to prevent relatively small wheel-speed fluctuations occurring due to bouncing, turning, or the like, from producing a bad influence on the above-noted error rate $\Delta K$, calculation of the error rate $\Delta K$ is inhibited in case that the diameter-difference ratio $\epsilon$ is below the minimum diameter-difference ratio $\epsilon_{LO}$. In other words, the minimum diameter-difference ratio $\epsilon_{LO}$ corresponds to a threshold of a lower dead zone necessary to determine whether or not the calculation of the error rate $\Delta K$ should be executed. In order to prevent relatively large wheel-speed fluctuations occurring due to acceleration slip, from producing a bad influence on the above-noted error rate $\Delta K$, calculation of the error rate $\Delta K$ is inhibited in case that the diameter-difference ratio $\epsilon$ is above a predetermined maximum diameter-difference ratio $\epsilon_{Hi}$. That is, the maximum diameter-difference ratio $\epsilon_{Hi}$ corresponds to a threshold of an upper dead zone for the calculation of the error rate $\Delta K$. In other words, the maximum diameter-difference ratio $\epsilon_{Hi}$ serves as an index necessary to decide as to whether the arithmetic processing of the anti-skid control should not be executed. In case of puncture of the tire as well as acceleration slip, the calculation of the error rate $\Delta K$ is not executed, since the calculated diameter-difference ratio $\epsilon$ easily exceeds the maximum diameter-difference ratio $\epsilon_{Hi}$ (the threshold of the upper dead zone). The two diameter-difference ratios $\epsilon_{LO}$ and $\epsilon_{Hi}$ are advantageous to enhancement of reliability of the calculated error rate $\Delta K$. When the diameter-difference ratio $\epsilon$ is maintained outside of lower and upper dead zones for a predetermined period $\Delta t1$ or more, i.e., in case a particular condition defined by the inequality $\epsilon_{LO}<\epsilon<\epsilon_{Hi}$ is satisfied for the predetermined period $\Delta t1$ or more, each wheel speed is regarded as being in a stable state. Under this condition, set at "1" is a compensatory condition setting flag Fc which flag indicating whether or not the wheel speed of the different-diameter road wheel with the small-sized tire should be compensated. The flag Fc set at "1" means that the condition necessary for compensation of the different-diameter wheel speed is completely satisfied, while the flag Fc set at "0" means that the above-mentioned necessary condition is not yet satisfied. In the case of the flag Fc=1, the calculation of the error rate $\Delta K$ is executed and then the maximum wheel speed Vwmax is properly compensated on the basis of the newly calculated error rate $\Delta K$. Also, a first timer is provided to determine whether the predetermined time period Atl has been elapsed. Concretely, the microcomputer determines that the predetermined period $\Delta t1$ has been elapsed when a counted value TMR1 of the first timer reaches a predetermined value TMR1o. In the pressure control procedure executed as time-triggered interrupt routines, the sampling is executed every predetermined sampling time intervals $\Delta T$. Therefore, the predetermined value TMR1o is set at a sampling number counted up until the product $n\Delta T$ of the sampling number n and the sampling time interval $\Delta T$ reaches the predetermined period $\Delta t1$. For instance, the predetermined interval $\Delta T$ is set at 5 msec, while the predetermined period $\Delta t1$ is set at a comparatively long time such as 10 sec. To avoid control-hunting, a hysteresis is provided for the purpose of preventing the calculation of the error rate $\Delta K$ from being rapidly stopped when resetting the compensatory condition setting flag Fc at "0" as soon as the calculated diameter-difference ratio $\epsilon$ becomes below the minimum diameter-difference ratio $\epsilon_{LO}$. In more detail, an additional diameter-difference ratio $\epsilon_{OFF}$, which is preselected at a lower level than the minimum diameter-difference ratio $\epsilon_{LO}$, is provided to prevent the rapid stoppage of calculation of the error rate $\Delta K$. Actually, when the calculated diameter-difference ratio $\epsilon$ is maintained below the preselected diameter-difference ratio $\epsilon_{OFF}$ for a predetermined period $\Delta t2$ or more, the compensatory condition setting flag Fc is reset at "0" and additionally the error rate $\Delta K$ is initialized to "0". As set forth above, since the preselected diameter-difference ratio $\epsilon_{OFF}$ serves as an index necessary to stop the calculation of the error rate $\Delta K$, the additional diameter-difference ratio $\epsilon_{OFF}$ will be hereinafter referred to as a "stop diameter-difference ratio". A second timer is further provided to measure or record whether the predetermined period $\Delta t2$ has been elapsed. Concretely, the microcomputer determines that the predetermined time period $\Delta t1$ has been elapsed when a counted value TMR2 of the second timer reaches a predetermined value TMR2o. The predetermined value TMR2o is set at a sampling number counted up until the product $n\Delta T$ of the sampling number n and the sampling time interval $\Delta T$ reaches the predetermined period $\Delta t2$. For instance, the predetermined period $\Delta t2$ is set at a comparatively short time such as 1 sec. As appreciated, the diameter-difference ratio $\epsilon$ can be regarded as an index for setting the error rate $\Delta K$.

As appreciated, the wheel speed of each road wheel permanently fluctuates during driving of the vehicle, even when the above-noted particular condition defined by the inequality $\epsilon_{LO}<\epsilon<\epsilon_{Hi}$ is maintained for the predetermined period $\Delta t1$ or more. In other words, when the particular condition necessary to compensate the maximum wheel speed Vwmax by utilizing the newly calculated error rate $\Delta K$ is satisfied, the calculated diameter-difference ratio $\epsilon$ itself fluctuates permanently even within a range outside of the upper and lower dead zones, owing to constant fluctuations in both the maximum wheel speed Vwmax and the second highest wheel speed Vw2nd during driving. If such a fluctuating diameter-difference ratio $\epsilon$ is utilized for compensation of the maximum wheel speed Vwmax, a different-diameter wheel speed Vwjc which is calculated as the product $(1-\Delta K)$Vwmax, also fluctuates. Such undesirable fluctuations interfere with calculation of the pseudo vehicle speed and with calculation of the actual different-diameter wheel speed. In order to suppress rapid changes in the control parameters, such as the different-diameter wheel speed and the pseudo vehicle speed, obtained through the arithmetic processing every sampling time intervals $\Delta T$ when setting the error rate $\Delta K$, a preselected minute modified amount $\Delta Ko$ of the error rate $\Delta K$ is provided. Thus, the error rate $\Delta K$ is increased or decreased by the preselected minute modified amounts $\Delta Ko$ so that the error rate $\Delta K$ is adjusted to a target value at a proper controlled gain. In other words, in the system of the embodiment, fluctuating components of the wheel speed of each road wheel are suitably filtered out through a filtering process.

Moreover, in the system made according to the invention, the calculation of the diameter-difference ratio $\epsilon$ and the calculation of the error rate $\Delta K$ are inhibited suitably, as set out below. For example, in the vehicle equipped with four road wheels all installing a usual tire, when stopping in the turning state, the wheel speed of the inner wheel first becomes zero, since the inner-wheel speed is less than the outer-wheel speed. Owing to the comparatively small threshold $\epsilon_{LO}$ of the lower dead zone, slight fluctuations in the detected three wheel speeds tend to produce the calculated diameter-difference ratio $\epsilon$ above the threshold $\epsilon_{LO}$., even when four road wheels install the respective usual tires. In this case, though a wheel speed of either one of road wheels is zero and a wheel speed of the other road wheel is not zero, i.e., the actual vehicle speed is approximately zero, the error rate $\Delta K$ based on the diameter-difference ratio $\epsilon$ can be calculated as a value greater than zero for the purpose of compensation for the different-diameter wheel speed. To avoid the above-noted inconvenience, the calculation of the diameter-difference ratio $\epsilon$ and the calculation of the error rate $\Delta K$ are executed in case that the calculated pseudo vehicle speed is equal to or greater than a predetermined vehicle speed Vo. Additionally, the calculation of the diameter-difference ratio $\epsilon$ and the calculation of the error rate $\Delta K$ are not executed in case that the minimum wheel speed Vwmin of the detected wheel speed indicative signal values Vw$_{FL}$, Vw$_{FR}$ and Vw$_R$ is shifted to "0" or the calculated pseudo vehicle speed is less than the predetermined vehicle speed.

The microcomputer 25 of the wheel-brake pressure control circuit 18 executes an arithmetic processing for the wheel-speed compensation in accordance with the flow chart shown in FIG. 5, as hereinbelow described in detail. This wheel-speed compensation procedure is executed as time-triggered interrupt routines to be triggered every predetermined time intervals, for example 5 msec. The arithmetic processing for the wheel-speed compensation has a higher priority than the wheel-cylinder pressure control procedure of the anti-skid control shown in FIG. 3. In the flow chart shown in FIG. 5, AS denotes the anti-skid control flag, TMR1 denotes a counted value of the first timer, TMR2 denotes a counted value of the second timer, and Fc denotes the compensatory condition setting flag. Also, Fwj (j=FL, FR, R) denotes a flag which indicates a road wheel subjected to the wheel-speed compensation. The flag Fwj (j=FL, FR, R) will be hereinafter referred to as a "wheel-speed compensation wheel indicative flag".

Figure 5:
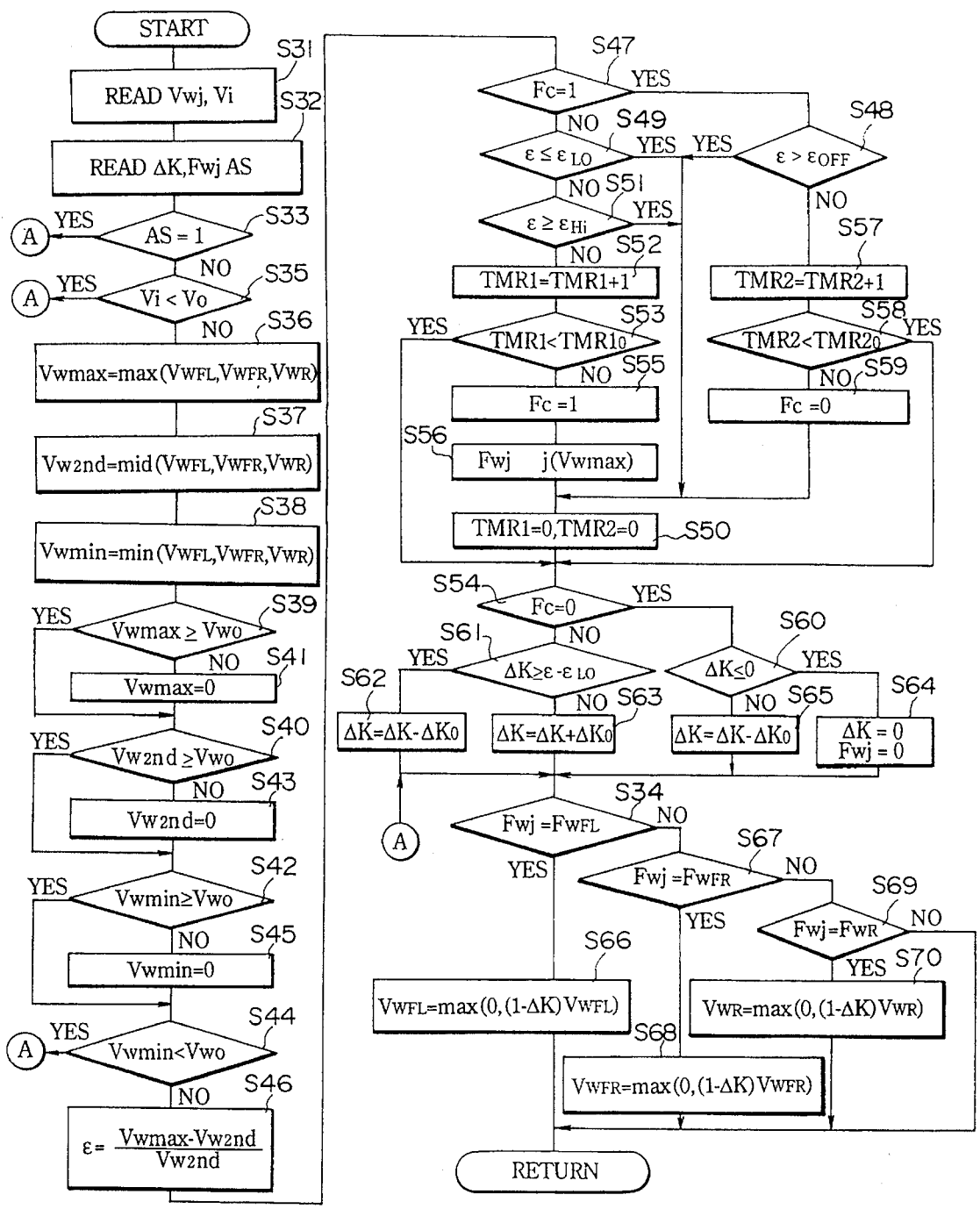
FIG. 5 is a flow chart illustrating a control flow of an arithmetic processing for compensation of a wheel speed of a different-diameter road wheel, which processing is executed by the wheel-brake cylinder pressure control circuit show in FIG. 3.

Referring now to FIG. 5, in step S31, first of all, derived are current wheel-speed indicative signal values Vwj from the wheel-speed arithmetic circuits 15j (j=FL, FR, R) and a current calculated value Vi of the pseudo vehicle speed from the pseudo vehicle speed generator 17.

In step S32, read are an error rate $\Delta K$ stored in the memory 25c, a wheel-speed compensation wheel indicative flag Fwj, and the anti-skid control flag AS used for the arithmetic processing shown in FIG. 3.

In step S33, a test is made to determine whether the anti-skid control flag AS is set at "1". When the answer to step S33 is affirmative (YES), i.e., the anti-skid control flag AS is set at "1", step S34 proceeds. When the answer to step S33 is negative (NO), step S35 proceeds. In step S35, a test is made to determine whether the pseudo vehicle speed Vi derived at step S31 is less than the predetermined vehicle speed Vo. When the answer to step S35 is affirmative, i.e., the pseudo vehicle speed Vi is less than the predetermined vehicle speed Vo, step S34 proceeds. When the pseudo vehicle speed Vi is equal to or greater than the predetermined vehicle speed Vo, step S36 proceeds.

In step S36, selected is the maximum wheel speed Vwmax from the three wheel-speed indicative signal values VwFL, VwFR, and VwR as indicated by the following expression (2). The procedure flows from step S36 to step S37.

$$Vwmax = max\ (VwFL, VwFR, VwR) \qquad (3)$$

In step S37, selected is the second highest wheel speed Vw2nd from the three wheel-speed indicative signal values VwFL, VwFR, and VwR as indicated by the following expression (3). The procedure flows from step S37 to step S38.

$$Vw2nd = mid\ (VwFL, VwFR, VwR) \qquad (4)$$

In step S38, selected is the minimum wheel speed Vwmin from the three wheel-speed indicative signal values VwFL, VwFR, and VwR as indicated by the following expression (4). The procedure flows from step S38 to step S39.

$$Vwmin = min\ (VwFL, VwFR, VwR) \qquad (4)$$

In step S39, a test is made to determine whether the maximum wheel speed Vwmax is equal to or greater than a predetermined wheel speed Vwo. The predetermined wheel speed Vwo is a small wheel-speed threshold which is preselected in such a manner as to be in correlation with the minimum diameter-difference ratio $\epsilon LO$ (the threshold of the lower dead zone). When the maximum wheel speed Vwmax is above the predetermined wheel speed Vwo, step S40 proceeds. In contrast, when the maximum wheel speed Vwmax is less than the predetermined wheel speed Vwo, step S41 proceeds.

In step S41, the maximum wheel speed Vwmax is set at "0" and then the procedure flows to step S40.

In step S40, a test is made to determine whether the second highest wheel speed Vw2nd is equal to or greater than the predetermined wheel speed Vwo. When the second highest wheel speed Vw2nd is above the predetermined wheel speed Vwo, step S42 proceeds. When the second highest wheel speed Vw2nd is less than the predetermined wheel speed Vwo, step S43 proceeds.

In step S43, the second highest wheel speed Vw2nd is set at "0" and then the procedure flows to step S42.

In step S42, a test is made to determine whether the minimum wheel speed Vwmin is equal to or greater than the predetermined wheel speed Vwo. When the minimum wheel speed Vwmin is above the predetermined wheel speed Vwo, step S44 proceeds. When the minimum wheel speed Vwmin is less than the predetermined wheel speed Vwo, step S45 proceeds.

In step S45, the minimum wheel speed Vwmin is set at "0" and then step S44 proceeds.

In step S44, a test is made to determine whether the minimum wheel speed Vwmin selected at step S38 or the minimum wheel speed Vwmin set at "0" is less than the predetermined wheel speed Vwo. When the answer to step S44 is affirmative (YES), i.e., the minimum wheel speed Vwmin is less than the predetermined wheel speed Vwo, the procedure flows to step S34. Conversely, when the answer to step S44 is negative, i.e., the minimum wheel speed Vwmin is above the predetermined wheel speed Vwo, step S46 proceeds.

In step S46, the diameter-difference ratio $\epsilon$ is calculated on the basis of the maximum wheel speed Vwmax derived at step S36 and the second highest wheel speed Vw2nd derived at step S37, in accordance with the following expression (5).

$$\epsilon = (Vwmax - Vw2nd)/Vw2nd \qquad (5)$$

In step S47, a test is made to determine whether the compensatory condition setting flag Fc is set at "1". When the flag Fc is set at "1", step S48 proceeds. When the flag Fc is reset at "0", step S49 proceeds.

In step S49, a test is made to determine whether the diameter-difference ratio $\epsilon$ calculated at step S46 is equal to or less than the predetermined minimum diameter-difference ratio $\epsilon LO$. When the diameter-difference ratio $\epsilon$ is below the minimum diameter-difference ratio $\epsilon LO$, step S50 proceeds. When the diameter-difference ratio $\epsilon$ is above the minimum diameter-difference ratio $\epsilon LO$, step S51 proceeds at which a test is made to determine whether the diameter-difference ratio $\epsilon$ calculated at step S46 is equal to or greater than the predetermined maximum diameter-difference ratio $\epsilon Hi$. When the diameter-difference ratio $\epsilon$ is above the maximum diameter-difference ratio $\epsilon Hi$, step S50 proceeds. When the diameter-difference ratio $\epsilon$ is below the maximum diameter-difference ratio $\epsilon Hi$, step S52 proceeds at which the counted value TMR1 of the first timer is incremented by 1. The procedure flows from step S52 to step S53.

In step S53, a test is made to determine whether the counted value TMR1 of the first timer is less than the predetermined value TMR1o. When the counted value TMR1 of the first timer is less than the predetermined value TMR1o, step S54 proceeds. In case of TMR1≧TMR1o, the procedure flows to step S55.

In step S55, the compensatory condition setting flag Fc is set at "1" and thereafter step S56 proceeds.

In step S56, the suffix j of the wheel-speed compensation wheel indicative flag Fwj (j=FL, FR, R) is set to a position j(Vwmax) of the road wheel having the maximum wheel speed Vwmax. Then, the flag Fwj stored in the memory 25c is updated by the above-mentioned wheel-speed compensation wheel indicative flag Fwj whose suffix j is set at the road-wheel position j(vwmax) corresponding to the maximum wheel speed Vwmax. Thereafter, the procedure flows from step S56 to step S50.

In step S48, a test is made to determine whether the calculated diameter-difference ratio $\epsilon$ is greater than the stop diameter-difference ratio $\epsilon OFF$. In case of $\epsilon > \epsilon OFF$, the procedure jumps to step S50. In case of $\epsilon \leq \epsilon OFF$, the procedure flows from step S48 to step S57.

In step S57, the counted value TMR2 of the second timer is incremented by "1", and then step S58 proceeds.

In step S58, a test is made to determine whether the counted value TMR2 of the second timer is less than the predetermined value TMR2o. In case of TMR2<TMR2o, the procedure flows to step S54. In case of TMR2≧TMR2o, the procedure flows to step S59.

In step S59, the compensatory condition setting flag Fc is reset to "0", and thereafter step S50 proceeds.

In step S50, the counted value TMR1 of the first timer and the counted value TMR2 of the second timer are both reset to "0", and thereafter the procedure flows to step S54.

In step S54, a test is made to determine whether the compensatory condition setting flag Fc is reset at "0". In case of Fc=0, step S60 proceeds. In case of Fc=1, step S61 proceeds.

In step S61, a test is made to determine whether the error rate $\Delta K$ is equal to or greater than the difference ($\epsilon - \epsilon_{LO}$) between the diameter-difference ratio $\epsilon$ and the minimum diameter-difference ratio $\epsilon_{LO}$. In case of $\Delta K \geq (\epsilon - \epsilon_{LO})$, step S62 proceeds. In case of $\Delta K < (\epsilon - \epsilon_{LO})$, step S63 proceeds.

In step S62, on the basis of the relation of $\Delta K > (\epsilon - \epsilon_{LO})$, the error rate $\Delta K$ is regarded as still too great. Thus, in step S62, the current error rate $\Delta K$ is replaced with a new error rate obtained by subtracting the preselected minute modified amount $\Delta K_o$ from the current error rate $\Delta K$. The error rate $\Delta K$ stored in the memory 25c is updated by the new error rate $\Delta K$ of the outside-diameter difference. Thereafter, the procedure flows to step S34.

In step S63, on the basis of the relation of $\Delta K < (\epsilon - \epsilon_{LO})$, the error rate $\Delta K$ is regarded as still too small. Thus, in step S63, the current error rate $\Delta K$ is replaced with a new error rate obtained by adding the preselected minute modified amount $\Delta K_o$ to the current error rate $\Delta K$. The error rate $\Delta K$ stored in the memory 25c is updated by the new error rate $\Delta K$ of the outside-diameter difference. Thereafter, the procedure flows to step S34.

In step S60, a test is made to determine whether the error rate $\Delta K$ is equal to or less than "0". In case of $\Delta K \leq 0$, step S64 proceeds. In case of $\Delta K > 0$, step S65 proceeds.

In step S64, the error rate $\Delta K$ is set at "0" and additionally the wheel-speed compensation wheel indicative flag Fwj is cleared and set at "0". The data in the memory 25c are updated by the error rate $\Delta K$ set at "0" and the wheel-speed compensation wheel indicative flag Fwj set at "0". Thereafter, the procedure flows to step S34.

In step S65, on the basis of the relation of $\Delta K > 0$, the error rate $\Delta K$ is regarded as still too great. Thus, in step S65, the current error rate $\Delta K$ is replaced with a new error rate obtained by subtracting the preselected minute modified amount $\Delta K_o$ from the current error rate $\Delta K$. The error rate $\Delta K$ stored in the memory 25c is updated by the new error rate $\Delta K$. Thereafter, the procedure flows to step S34.

In step S34, a test is made to determine whether the wheel-speed compensation wheel indicative flag Fwj set at step S56 or read at step S32 is coincident with a front-left wheel indicative flag FwFL indicating that the front-left wheel 1FL is subjected to the wheel-speed compensation. In case that the front-left wheel 1FL is subjected to the wheel-speed compensation, i.e., when the flag Fwj is coincident with the front-left wheel indicative flag FwFL, step S66 proceeds. In case that the front-left wheel 1FL is not subjected to the wheel-speed compensation, step S67 proceeds.

In step S67, a test is made to determine whether the wheel-speed compensation wheel indicative flag Fwj set at step S56 or read at step S32 is coincident with a front-right wheel indicative flag FwFR indicating that the front-right wheel 1FR is subjected to the wheel-speed compensation. In case that the front-right wheel 1FR is subjected to the wheel-speed compensation, i.e., when the flag Fwj is coincident with the front-right wheel indicative flag FwFR, step S68 proceeds. In case that the front-right wheel 1FR is not subjected to the wheel-speed compensation, step S69 proceeds.

In step S69, a test is made to determine whether the wheel-speed compensation wheel indicative flag Fwj set at step S56 or read at step S32 is coincident with a rear wheel indicative flag FwR indicating that the rear wheel 1RL or 1RR is subjected to the wheel-speed compensation. In case that the rear wheel is subjected to the wheel-speed compensation, i.e., when the flag Fwj is coincident with the rear wheel indicative flag FwR, step S70 proceeds. In case that the rear wheel is not subjected to the wheel-speed compensation, the main program is returned.

In step S66, the detected front-left wheel-speed indicative signal value VwFL is compensated in accordance with the following expression (6), utilizing the front-left wheel-speed indicative signal value VwFL read at step S31 and the error rate $\Delta K$ set at either one of steps S62, S63, S64 and S65 or read at step S32. The front-left wheel-speed indicative data stored in the memory 25c is updated by the compensated front-left wheel-speed. Thereafter, the main program is returned.

$$V_{wFL} = \max(0, (1-\Delta K)V_{wFL}) \qquad (6)$$

In step S68, the detected front-right wheel-speed indicative signal value VwFR is compensated in accordance with the following expression (7), utilizing the front-right wheel-speed indicative signal value VwFR read at step S31 and the error rate $\Delta K$ set at either one of steps S62, S63, S64 and S65 or read at step S32. The front-right wheel-speed indicative data stored in the memory 25c is updated by the compensated front-right wheel-speed. Thereafter, the main program is returned.

$$V_{wFR} = \max(0, (1-\Delta K)V_{wFR}) \qquad (7)$$

In step S70, the detected rear wheel-speed indicative signal value VwR is compensated in accordance with the following expression (8), utilizing the rear wheel-speed indicative signal value VwR read at step S31 and the error rate $\Delta K$ set at either one of steps S62, S63, S64 and S65 or read at step S32. The rear wheel-speed indicative data stored in the memory 25c is updated by the compensated rear wheel-speed. Thereafter, the main program is returned.

$$V_{wR} = \max(0, (1-\Delta K)V_{wR}) \qquad (8)$$

The operation of the arithmetic processing shown in FIG. 5 will be hereinbelow explained in detail, on the assumption that during straight-ahead driving on a good road such as dry pavement, a mean value of a vehicle speed is maintained at a higher level than the predetermined vehicle speed Vo, each wheel speed is maintained at a higher level than the predetermined wheel speed Vwo, the brakes are not applied, a small-sized emergency tire is installed at the front-left wheel 1FL for example, and the rear drive-wheel speed VwR is maintained at a slightly high level as compared with the front-right driven-wheel speed VwFR. Additionally, the error rate $\Delta K$ and the wheel-speed compensation wheel indicative flag Fwj are both set at "0".

In the event that the arithmetic processing of FIG. 5 starts in the above-noted vehicle driving state, the procedure transfers from step S33 to step S35, since the anti-skid control flag AS is reset at "0" at step 32. Since the pseudo vehicle speed Vi read at step S31 is above the predetermined vehicle speed Vo, the procedure flows to step S36. During straight-ahead driving on good roads, the wheel speed VwwFL of the front-left wheel 1FL with the small-sized tire is comparatively stable. Thus, the wheel speed VwFL of the front-left different-diameter wheel 1FL will become remarkably great as compared with the other wheel speeds VwFR and VwR. Let's suppose that the rear wheel speed VwR regarded as the average rear wheel speed between the rear-left and rear-right wheels 1RL and 1RR is slightly greater than the front-right wheel speed VwFR of the front-right wheel with the usual tire, because the drive-wheel speed generally tends to be greater than the driven-wheel speed. In this case, the magnitude relationship of the three wheel speeds is represented by the inequality of VwFL>VwR>VwFR. Thus, the front-left wheel speed VwFL is selected as the maximum wheel speed Vwmax in step S36, the rear wheel speed VwR is selected as the second highest wheel speed Vw2nd in step S37, and the front-right wheel speed VwFR is selected as the minimum wheel speed Vwmin in step S38. These data are temporarily memorized in a buffer employed in the processor 25$b$ of the microcomputer 25. Furthermore, since the respective wheel speeds Vwj are above the predetermined wheel speed Vwo, these wheel speed data Vwmax, Vw2nd and Vwmin are not changed to "0" at consecutive steps S39, S41, S40, S43, S42 and S45. Owing to the minimum wheel speed Vwmin greater than the wheel speed Vwo, the procedure flows from step S44 to step S46. In step S46, the diameter-difference ratio $\epsilon$ is derived as the ratio (VwFL−VwR)/VwR. Assuming that the error between an actual vehicle speed and the average rear drive-wheel speed VwR is negligible although the rear wheel speed VwR may be slightly greater than the actual vehicle speed, the calculated diameter-difference ratio is identical essentially to a value precisely reflecting the ratio of the deviation between the outside radius of the different-diameter road wheel installing the small-sized tire and the outside radius of the road wheel installing the usual tire. In step S47 subsequent to step S46, the procedure flows to step S49, since the compensatory condition setting flag Fc remains reset to "0". During straight-ahead driving on good roads in the vehicle installing the small-sized emergency tire, the respective wheel speeds Vwj are stable and regarded as reflecting precisely the ratio of their outside radii. Under these conditions, the diameter-difference ratio $\epsilon$ tends to be greater than the minimum diameter-difference ratio $\epsilon$LO having less influence on the anti-skid brake control and less than the maximum diameter-difference ratio $\epsilon$Hi above which the arithmetic processing of the anti-skid control is unnecessary. Thus, the procedure flows from step S49 via step S51 to step S52 at which the counted value TMR1 of the first timer is incremented. At this time, since the value TMR1 of the timer does not yet reach the predetermined value TMR1o, the procedure flows from step S53 to step S54. In step S54, since the compensatory condition setting flag Fc remains set at "0", the procedure shifts to step S60. The necessary condition for calculation of the error rate $\Delta$K is not kS satisfied because of TMR1<TMR1o. Actually, the current error rate $\Delta$K is still maintained at "0". The procedure flows from step S60 to step S64 at which the error rate zXK is set at "0" and the wheel-speed compensation wheel indicative flag Fwj is cleared. Thereafter, the procedure returns to the main program via steps S34, S67 and S69. The above-mentioned flow is repeated every sampling timer intervals $\Delta$T, until the counted value TMR1 of the first timer exceeds the predetermined value TMR1o, while continuing the straight-ahead driving on the good roads. Thereafter, upon the value TMR1 of the timer reaches the predetermined value TMR1o, the procedure shifts from step S53 to step S55 at which the compensatory condition setting flag Fc is set at "1". In step S56, the suffix j of the wheel-speed compensation wheel indicative flag Fwj is set at the position "FL" of the road wheel 1FL having the maximum wheel speed Vwmax. That is, the flag Fwj is indicated as the flag FwFL. Furthermore, in step S50, the value TMR1 is reset at "0". Under this condition, since the compensatory condition setting flag Fc is set at "1", the procedure flows from step S54 to step S61. Since the error rate $\Delta$K is still maintained at "0", the procedure shifts from step S61 to step S63. In step S63, the error rate $\Delta$K is increased by the preselected minute modified amount $\Delta$Ko. Thereafter, since the wheel-speed compensation indicative flag Fwj is identical to the flag FwFL, the procedure flows from step S34 to step S66. In step S66, the front-left wheel-speed indicative data VwFL stored in the memory 25$c$ is compensated by the error rate $\Delta$K (equal to the minute modified amount $\Delta$Ko in this case). In this manner, one cycle of the interrupt sub-routine terminates. After this, a new sub-routine starts to be time-triggered again at the predetermined sampling time interval $\Delta$T. The wheel-speed compensation wheel indicative flag Fc is continuously maintained at "1", until the diameter-difference ratio $\epsilon$ is equal to or less than the stop diameter-difference ratio $\epsilon$OFF and additionally the predetermined timer period TMR2o is elapsed. In accordance with the execution of the subsequent time-triggered interrupt sub-routine, the procedure flows from step S47 to step S48 owing to Fc=1. Since the calculated diameter-difference ratio $\epsilon$ is greater than the stop diameter-difference ratio $\epsilon$OFF at step S48, the procedure jumps from step S48 to step S50. Thereafter, the procedure flows from step S50 through steps S54, S61, S63 and S34 to step S66. For instance, at two cycles of the sub-routine, the error rate $\Delta$K is set at 2$\Delta$Ko at step S63, and the current front-left wheel-speed VwFL can be decreasingly compensated to the value of (1−2$\Delta$Ko)VwFL. The above-noted sub-routine is repeatedly executed. In this manner, during straight-ahead driving of the vehicle equipped with the different-diameter front-left road wheel with the small-sized tire on good roads, the increase in the error rate $\Delta$K is continued with the preselected minute modified amount $\Delta$Ko every sampling time interval $\Delta$T, and as a result the detected front-left wheel-speed indicative signal value VwFL is decreasingly compensated with a negative controlled gain−$\Delta$K, as appreciated from step S66 of FIG. 5. Upon the error rate $\Delta$K becomes equal to or greater than the difference ($\epsilon$−$\epsilon$LO) between the diameter-difference ratio $\epsilon$ and the minimum diameter-difference ratio $\epsilon$LO in accordance with the increase in the error rate $\Delta$K, the error rate $\Delta$K, the procedure shifts from step S61 to step S62 at which the current error rate $\Delta$K is decreasingly compensated by the minute modified amount $\Delta$Ko. As appreciated, the error rate $\Delta$K can be converged to the designated value ($\epsilon$−$\epsilon$LO) through repetition of the sub-routine shown in FIG. 5, under the above-noted vehicle driving condition. In case that the error rate $\Delta$K is converged to the designated value ($\epsilon$−$\epsilon$LO), the error rate $\Delta$K can be regarded as being essentially equivalent to the value ($\epsilon$−$\epsilon$LO), and the current front-left wheel speed VwFL is replaced with a new front-left wheel speed corresponding to the product $\{1-(\epsilon-\epsilon LO)\}$VwFL of (1−$\Delta$K) and the current front-left wheel speed VwFL. At the end of the above-noted convergence of the error rate $\Delta$K to the designated value ($\epsilon$−$\epsilon$LO), since the current front-left wheel speed VwFL can be regarded as being substantially equal to the new front-left wheel speed corresponding to the product $\{1-(\epsilon-\epsilon LO)\}VwFL$, it will be assumed that the equation is defined as $VwFL=\{-(\epsilon-\epsilon LO)\}VwFL$, at step S66. As appreciated from the equation, the calculated diameter-difference ratio $\epsilon$ is adjusted down to the minimum diameter-difference ratio $\epsilon LO$ at the end of the convergence. Owing to the converged error rate $\Delta K$ satisfactorily taking account of the rate of the outside diameter difference between the small-sized different-diameter front-left road wheel and the other road wheel with the usual tire, the compensated value of the front-left wheel-speed indicative signal value VwFL becomes essentially equivalent to the actual or true front-left wheel speed. Therefore, the pseudo vehicle speed Vi derived from the pseudo vehicle speed generator 17, becomes also essentially equivalent to the actual or true vehicle speed. Thus, the slip ratios Sj of the other wheels installing the usual tire are properly adjusted to be essentially equivalent to their actual or true slip ratios. The wheel-cylinder pressure of the road wheel with the usual tire can be suitably controlled in accordance with the anti-skid control procedure (see FIG. 4) based on the properly adjusted slip ratios and whereby wheel-lock of each road wheel with the usual tire can be effectively avoided and the steering effect and the shorter braking distance are both assured. Since the slip ratio Sj of the small-sized different-diameter front-left road wheel 1FL is adjusted to a proper value based on both the compensated the front-left wheel-speed VwFL which is adjusted to be essentially equivalent to the actual front-left wheel speed and the calculated pseudo vehicle speed Vi which can be regarded as being equivalent to the actual or true vehicle speed, the wheel-cylinder pressure of the wheel-brake cylinder 2FL of the front-left wheel 1FL can also be suitably controlled in accordance with the anti-skid control procedure based on the properly adjusted slip ratio and whereby wheel-lock of each road wheel with the usual tire can be effectively avoided and the steering effect and the shorter braking distance are both assured. Thus, with respect to the small-sized front-left road wheel, wheel-lock can lie effectively avoided.

In case of the straight-ahead driving on the actual roads, even when the roads appear to be flat, the respective wheel speed Vwj fluctuates permanently. Therefore, the diameter-difference ratio $\epsilon$ calculated at step S46 also tends to fluctuate within the predetermined band defined by $\epsilon LO<\epsilon<\epsilon Hi$. Supposing the diameter-difference ratio $\epsilon$ is greater than the stop diameter-difference ratio $\epsilon OFF$, once the compensatory condition setting flag Fc is set at "1", the procedure flows from step S47, S48, S50, S54 and S61 to step S62 or step S63. At step S62, the current error rate $\Delta K$ is compensated with the positive minute modified amount $+\Delta Ko$ in order to increasingly compensate the current error rate $\Delta K$. Alternatively, at step S63, the current error rate $\Delta K$ is compensated with the negative minute modified amount $-\Delta Ko$ in order to decreasingly compensate the current error rate $\Delta K$. By way of repetition of the above-noted stepwise modification of the error rate $\Delta K$, the different-diameter front-left wheel speed VwFL gradually approaches to the actual or true wheel speed at the different-diameter road wheel with the small-sized tire. The approach to the actual different-diameter wheel speed means that the maximum wheel speed Vwmax is decreasingly compensated. Simultaneously, the diameter-difference ratio $\epsilon$ itself decreasingly varies and finally reaches the minimum diameter-difference ratio $\epsilon LO$ as previously explained. Even when the diameter-difference ratio $\epsilon$ based on the fluctuations in the respective wheel speeds during straight-ahead driving on good roads is momentarily shifted to a value considerably greater than the minimum diameter-difference ratio $\epsilon LO$ and less than the maximum diameter-difference ratio $\delta Hi$ due to bouncing for example, the calculated error rate $\Delta K$ is varied by preselected minute modified amounts $\pm\Delta Ko$ by way of the above-noted steps S62 or S63, and then the different-diameter front-left wheel speed VwFL is also compensated by correction values correlated with the minute modified amounts $\pm\Delta Ko$. As a result, the influence on the calculated value of the error rate $\Delta K$ owing to such a momentary wheel-speed fluctuation, is effectively suppressed. That is, steps S61, S62 and S63 serves to filter out the error rate $\Delta K$ by the designated filtering process at which a rapid change in the calculated error rate $\Delta K$ can be avoided.

In contrast to the above, in the event that the diameter-difference ratio $\epsilon$ becomes less than or equal to the minimum diameter-difference ratio $\epsilon LO$ owing to comparatively small wheel-speed fluctuations caused by bouncing, turning or the like under a condition wherein the counted value TMR1 of the first timer is still less than the predetermined value TMR1o and the wheel-speed compensation setting flag Fc is not set at "1", the procedure flows from step S49 to step S50. On the other hand, in the event that the diameter-difference ratio $\epsilon$ becomes greater than or equal to the maximum diameter-difference ratio $\epsilon Hi$ owing to comparatively large wheel-speed fluctuations caused by acceleration slip occurring due to changes in road conditions when accelerating for example, the procedure flows from step S51 to step S50. Irrespective of stable or unstable wheel-speed conditions, at step S50, the counted value TMR1 of the first timer is always reset to "0". Therefore, the compensation of the different-diameter front-left wheel speed VwFL is maintained in the standby state from the reset point of the counted value TMR1 until the wheel-speed condition is shifted from the above-noted unstable condition to the stable condition, i.e., until the wheels speed compensation setting flag Fc is set again to "1". As set out above, since the predetermined value TMR1o corresponding to the predetermined period $\Delta t1$ is set at a comparatively long time such as 10 sec and the flag Fc is maintained at "0" for the predetermined period TMR1o, the procedure flows from step S54 through step S60 via steps S64 or S65 to step S34. Thereafter, the procedure flows through steps S34, S67, S69 and returns the main program. At step S64, the current error rate $\Delta K$ is set at "0" and simultaneously the wheel-speed compensation wheel indicative flag Fwj is reset to "0". Alternatively, at step S65, the error rate $\Delta K$ is decreasingly compensated by the negative minute modified amount $-\Delta Ko$ in order to decreasingly compensate the current error rate $\Delta K$. By way of repetition of the above-noted modification of the error rate $\Delta K$ at step S65 or setting of the error rate $\Delta K$ to "0" at step S64, the current error rate $\Delta K$ is converged to "0" for the comparatively long predetermined period TMR1o. In case of $\Delta K="0"$, the equation $VwFL=(1-\Delta K)VwFL$ can be represented as $VwFL=(1-0)VwFL$. In this case, the current front-left wheel speed VwFL is replaced with a new front-left wheel speed corresponding to the product of $(1-0)$ and the current front-left wheel speed VwFL. In this case, the above-indicated equation $VwFL=(1-0)VwFL$ means that the different-diameter front-left wheel speed is maintained at the current value but not compensated actually. That is to say, when the detected wheel speed Vwj is kept in the unstable condition, the compensation of the different-diameter wheel speed does not be executed. In other words, the compensation of the different-diameter wheel speed of the road wheel with small-sized tire can be executed only when the detected wheel speed Vwj is adequately stable. Thus, the system of the embodiment can enhance a reliability of the compensated value VwFLC of the different-diameter wheel speed.

On the other hand, in the event that the diameter-difference ratio $\epsilon$ is momentarily below the stop diameter-difference ratio $\epsilon$OFF at step S46 of FIG. 5 owing to shift from the above-explained straight-ahead driving state to the vehicle turning state for example, the procedure transfers from step S48 to step S57 at which the counted value TMR2 of the second timer is incremented. Since the counted value TMR2 of the second timer is not yet reach the predetermined value TMR2o, the procedure jumps from step S58 to step S54. At step S54, since the compensatory condition setting flag Fc remains set at "1" and additionally the wheel-speed compensation wheel indicative flag Fwj is set at "FwFL", the procedure flows from step S54 to step S61 and thereafter the procedure further flows through steps S62 or S63 via step S34 to step S66. The above-noted flow is repeated so as to compensate the different-diameter front-left wheel speed VwFL read at step 31 for a while until the counted value TMR2 of the second timer becomes above the predetermined value TMR2o corresponding to the predetermined time period $\Delta t2$. However, owing to the predetermined period $\Delta t2$ set at a comparatively short time period such as 1 sec, the counted value TMR2 can reach the predetermined value TMR2o soon. Upon the counted value TMR2 of the second timer reaches the predetermined value TMR2o, the procedure shifts from step S58 to step S59 through the sampling time-triggered interrupt sub-routine executed just after the predetermined value TMR2o has been reached, with the result that the compensatory condition setting flag Fc is reset at "0". At step S50 subsequent to step S59, the counted value TMR2 of the second timer is reset to "0". Thus, the procedure shifts from step S54 to step S60. At step S60, since the current error rate $\Delta K$ stored in the memory 25c is still greater than "0", step S65 enters at which the current error rate $\Delta K$ is replaced with a new error rate obtained by subtracting the preselected minute modified amount $\Delta K_o$ from the current error rate $\Delta K$. At this time, since the wheel-speed compensation wheel indicative flag Fwj is still set at "FwFL", the procedure flows from step S65 via step S34 to step S66 at which the different-diameter front-left wheel speed indicative data VwFL stored in the memory 25c is increasingly compensated with the increasing rate $+\Delta K_o$. This flow (from step S54 through steps S60, S65 and S34 to step S66) is repeatedly executed until the particular condition indicated by $\epsilon LO < \epsilon < \epsilon Hi$ is continuously satisfied for at least the predetermined time period $\Delta t1$ set at a comparatively long time period such as 10 sec, and as a result the compensatory condition setting flag Fc is shifted from "0" to "1". In this manner, the error rate $\Delta K$ is gradually converged to "0" with a negative minimum modified amount $-\Delta K_o$ by way of steps S60 and S65 every sampling time intervals $\Delta T$ such as 5 msec. Upon the error rate $\Delta K$ becomes a value below "0", the procedure transfers from step S60 to S64 at which the error rate $\Delta K$ is set at "0" and additionally the wheel-speed compensation wheel indicative flag Fwj is cleared. Thereafter, the procedure returns to the main program through steps S34, S67 and S69. As appreciated, just before the error rate $\Delta K$ has been converged to "0" by way of steps S60, S64 and S65, the front-left wheel speed VwFL currently read-in at step S31 (the different-diameter wheel speed) is replaced with a new front-left wheel speed essentially equal to the product $(1-0)$VwFL of $(1-0)$ and the current front-left wheel speed VwFL which product is derived from the expression (6), i.e., VwFL=max $(0, (1-\Delta K)$VwFL$)$. In this case, the current front-left wheel speed VwFL is identical to the new front-left wheel speed VwFL. Consequently, the front-left wheel speed VwFL read-in at step S31 remains unchanged, so as to inhibit the detected front-left wheel speed from being compensated. Additionally, after the predetermined time period $\Delta t2$ such as 1 sec has been elapsed and the wheel-speed compensation wheel indicative flag Fc is reset to "0" at step S59, the flow from step S54 through step S60, steps S64 or S65 and S34 to step S66 is repeated every excessively short sampling time intervals $\Delta T$ such as 5 msec, so as to quickly converge the error rate $\Delta K$ to "0". Thus, the recovery from the compensated front-left wheel speed to the detected front-left wheel-speed VwFL read-in at step S31 can be quickly achieved in the above-noted case. As an additional example, the calculated diameter-difference ratio $\epsilon$ may be maintained at a value less than the stop diameter-difference ratio $\epsilon$OFF in case that the front-left road wheel with the small-diameter emergency tire is replaced with the road wheel with the usual tire and thus the four road wheels install the respective usual tires. In this case, created is the flow from step S48 to step S57. Owing to the predetermined counted value TMR2o corresponding to the comparative short time period $\Delta t2$, the compensated front-left wheel speed VwFL can be quickly recovered to the detected front-left wheel speed VwFL at step S31. In other words, the front-left wheel speed VwFL read-in at step S31 remains uncompensated. In such a case, since the small-sized different-diameter tire is not installed and there is no necessity for compensation of the different-diameter wheel speed, the anti-skid control based on the respective detected wheel speed VwFL, VwFR and VwR can be executed with a high control accuracy in accordance with the control procedure shown in FIG. 3. In the system of the embodiment, the error rate $\Delta K$ can be increased or decreased by the preselected minute modified amounts $\Delta K_o$ every sampling time intervals $\Delta T$ such as 5 msec and thus the compensated value of the different-diameter wheel speed stored in the memory 25c can be moderately varied according to the increasing rate (corresponding to the positive minute modified amount $+\Delta K_o$) or to the decreasing rate (corresponding to the negative minute modified amount $-\Delta K_o$). Even when the anti-skid control is executed during the above-noted recovery of the error rate $\Delta K$ to "0", a rapid change of the anti-skid control or a discontinuity of the control can be avoided by the aid of the filtering effect obtained by the filtering process of steps S60, S65 and S64.

Assuming that the anti-skid control begins to be executed in accordance with the control flow shown in FIG. 3 owing to depression of the brake pedal under a condition wherein the error rate $\Delta K$ is previously calculated in such a manner as to precisely reflect the ratio of the deviation between the outside radius of the different-diameter road wheel and the outside radius of the usual-diameter road wheel and the wheel-speed compensation wheel indicative flag Fwj is set at "FwFL", the anti-skid control flag AS which is read-in at step S32 every sampling time intervals $\Delta T$, is set at "1" Thus, the procedure jumps from step S33 to step S34, and then to step S66. The compensation for the front-left wheel speed VwFL is repeatedly executed at the time intervals $\Delta T$, utilizing the previously calculated error rate $\Delta K$. Thus, the compensated front-left wheel speed will be essentially equivalent to the actual or true front-left wheel speed. The compensated pseudo vehicle speed Vic based on the compensated front-left wheel speed is also essentially equivalent to the actual or true front-left wheel speed. It will be appreciated that each wheel-cylinder pressure can be properly controlled at the four road wheels including the small-diameter front-left road wheel 1FL by the anti-skid control utilizing the precise compensated pseudo vehicle speed Vic.

Assuming that the calculated pseudo vehicle speed from the generator 17 becomes less than the predetermined vehicle speed Vo under a condition wherein the error rate ΔK is previously calculated in such a manner as to precisely reflect the ratio of the deviation between the outside radius of the different-diameter road wheel and the outside radius of the usual-diameter road wheel and additionally the wheel-speed compensation wheel indicative flag Fwj is set at "FwFL", or the error rate ΔK is set at "0" and additionally the wheel-speed compensation wheel indicative flag Fwj is cleared, the procedure jumps from step S35 to step S34 through the interrupt routine shown in FIG. 5. Likewise, in the case that the minimum wheel speed Vwmin becomes less than the predetermined wheel speed Vwo correlated with the minimum diameter-difference ratio εLO, the procedure jumps from step S44 to step S34. In case that the error rate ΔK and the flag FwFL are both set when the vehicle begins to stop during turning, the detected front-left wheel speed VwFL read-in at step S31 is compensated to be properly adjusted towards the true front-left wheel speed through steps S34 and S66, utilizing the previously calculated error rate ΔK. On the other hand, in case that the error rate ΔK and the flag Fwj are both cleared when the vehicle begins to stop during turning, the compensation for the respective wheel speeds VwFL, VwFR or VwR is inhibited by way of the flow from step S64 through steps S34, S67 and S69 to the main program.

Although the interrupt routine shown in FIG. 5 is exemplified in case of the different-diameter tire is installed on the front-left wheel 1FL, the compensation for the different-diameter wheel speed can be executed in the same manner as the compensation for the different-diameter front-left wheel speed, in case that the different-diameter tire is installed on the front-right wheel 1FR, the rear-left wheel 1RL or the rear-right wheel 1RR. In the interrupt sub-routine shown in FIG. 5, steps 47 through S56 are related to the setting of the compensatory condition for the different-diameter wheel speed. A first series of steps S60, S64 and S65 and a second series of steps S61, S62 and S63 are related to the above-noted filtering process. The predetermined vehicle speed of step S35 corresponds to a vehicle-speed threshold necessary to decide whether the calculation for the error rate ΔK should be executed or not. In the block diagram shown in FIG. 1, the wheel-speed sensors 3FL, 3FR and 3R the wheel-speed arithmetic circuits 15FL, 15FR and 15R serve to detect the respective wheel speeds VwFL, VwFR and VwR. The select-HIGH switch 16 and the pseudo vehicle speed generator 17 serve to calculate the vehicle speed.

The simulation result of the wheel-cylinder pressure control executed by the anti-skid control system of the embodiment will be hereinafter described in detail in accordance with the time chart illustrated in FIGS. 6(a) to 6(h). The result indicated by the time chart is simulated on the assumption that the vehicle is driving on the flat road surface having less fluctuations in the coefficient of friction, the small-sized emergency tire is installed on the front-left wheel 1FL, the vehicle starts from the time t0 with a constant acceleration β o and travels in the straight-ahead direction, the traveling state is shifted from the accelerating state to the straight-ahead driving at a constant vehicle speed at the time t3 and the front-left wheel 1FL is simultaneously bounced due to irregularities of the road surface at the time t3, the brakes are applied to the four wheels by depression of the brake pedal from the time t12 in the above-noted straight-ahead driving state and the anti-skid brake control begins to be executed simultaneously at the time t12 so as to produce a desired deceleration, the brakes are released upon the desired deceleration is satisfied at the time t34 and a left-angle turn is made at a constant speed from the time t34, and the turning state of the vehicle is shifted to a left-angle turn on a constant radius at the time t36. Suppose the rear wheel speed VwR is selected as the second highest wheel speed Vw2nd, the rear wheel speed VwR selected as the second highest wheel speed Vw2nd is equivalent to the true or actual vehicle speed Vc except during braking, and during braking the actual vehicle speed Vc decreases linearly at a constant negative gradient along the straight line segment interconnecting the actual vehicle speed Vc equivalent to the rear wheel speed VwR selected as the second highest wheel speed Vw2nd just before braking and the actual vehicle speed Vc equivalent to the rear wheel speed VwR selected as the second highest wheel speed Vw2nd just after braking. Also, suppose the front-left wheel speed VwFL of the road wheel 1FL with the small-sized tire is always selected as the maximum vehicle speed Vwmax in the arithmetic processing of FIG. 5, and the front-left wheel speed VwFL compensated through the arithmetic processing of FIG. 5 is represented as a compensated front-left wheel speed VwFLC. The pseudo vehicle speed Vi from the pseudo vehicle speed generator 17 coincides with the front-left wheel speed selected as the maximum wheel speed Vwmax except during braking before compensating the front-left wheel speed VwFL. Upon the front-left wheel speed VwFL is compensated and thus the compensated front-left wheel speed VwFLC is set, the pseudo vehicle speed Vi coincides with the compensated front-left wheel speed VwFLC and represented as a compensated pseudo vehicle speed ViC. During braking before compensating the front-left wheel speed VwFL, the compensated pseudo vehicle speed ViC decreases linearly at the above-noted constant negative gradient along the straight line segment interconnecting the compensated pseudo vehicle speed ViC equivalent to the compensated front-left wheel speed VwFLC just before braking and the compensated pseudo vehicle speed ViC equivalent to the compensated front-left wheel speed VwFLC just after braking. A speed obtained by adding a velocity component corresponding to the minimum diameter-difference ratio εLO to the second highest wheel speed Vw2nd (VwR) is represented as a minimum diameter-difference ratio wheel speed VwLO. A speed obtained by adding a velocity component corresponding to the maximum diameter-difference ratio εHi to the second highest wheel speed Vw2nd is represented as a maximum diameter-difference ratio wheel speed VwHi. A speed obtained by adding a velocity component corresponding to the stop diameter-difference ratio εOFF to the second highest wheel speed Vw2nd is represented as a stop diameter-difference ratio wheel speed VwOFF. As previously explained according to the flow chart of FIG. 5, the three diameter-difference ratios εLO, εHi and εOFF are set at least except during anti-skid control. For the purpose of simplification of the disclosure, during braking, i.e., between the time duration defined by the times t12 and t34, the indication of these diameter-difference wheel speeds VwLO, VwHi and VwOFF is omitted. In case that the uncompensated front-left wheel speed VwFL selected as the maximum wheel speed Vwmax is set as the pseudo vehicle speed Vi, a velocity which is calculated in a manner so as to satisfy the reference slip ratio Sjo with regard to the pseudo vehicle speed Vi is represented as a target wheel speed V*w. In case that the compensated front-left wheel speed VwFLC is set as the compensated pseudo vehicle speed ViC, a velocity which is calculated in a manner so as to satisfy the reference slip ratio Sjo with regard to the compensated pseudo vehicle speed ViC is represented as a compensated target wheel speed V*wC.

In the shown time chart, FIG. 6(a) illustrates the relation between the second highest wheel speed Vw2nd (VwR) equivalent to the actual vehicle speed Vc and the maximum wheel speed Vwmax (VwFL) set as the pseudo vehicle speed Vi during non-braking, and the relation between the uncompensated maximum wheel speed Vwmax (VwFL) indicated by the two dotted line and the compensated front-left wheel speed VwFLC set as the compensated pseudo vehicle speed Vic indicated by the solid line. FIG. 6(b) illustrates variation of the counted value TMR1 of the first timer, while FIG. 6(c) illustrates variation of the counted value TMR2 of the second timer. FIG. 6(d) illustrates variation of the compensatory condition setting flag Fc. FIG. 6(e) illustrates variation of the anti-skid control flag AS in the arithmetic processing of FIG. 3. FIG. 6(f) illustrates the control characteristics between variations of the second highest wheel speed Vw2nd (VwR) obtained by the anti-skid control performed depending on the compensated target wheel speed V*wC and the second highest wheel speed Vw2ndN (VwRN) obtained by the anti-skid control performed depending on the uncompensated target wheel speed V*w. In FIG. 6(f), the second highest wheel speed Vw2nd (VwR) based on the compensated target wheel speed V*wC is indicated as the solid line, while the second highest wheel speed Vw2ndN (VwRN) based on the uncompensated target wheel speed V*wC is indicated by the phantom line. In FIG. 6(g), the solid line shows the rear-wheel acceleration/deceleration V'wR (V'w2nd) obtained by differentiating the rear wheel-speed VwR (Vw2nd) and the phantom line shows the rear-wheel acceleration/deceleration V'wRN (V'w2ndN) obtained by differentiating the rear wheel-speed indicative signal value VwRN (Vw2ndN). FIG. 6(h) illustrates the relation between the rear wheel-brake cylinder pressure PR controlled depending on the rear-wheel acceleration/deceleration V'wR (V'w2nd) and the rear wheel-brake cylinder pressure PRN controlled depending on the rear-wheel acceleration/deceleration V'wRN (V'w2ndN).

Variations of the respective speeds shown in FIG. 6(a) are hereinafter explained in detail in relation to both the arithmetic processing for the anti-skid control shown in FIG. 3 and the arithmetic processing for the wheel-speed compensation control shown in FIG. 5.

Referring now to FIG. 6(a), after starting with the constant acceleration β o from the time t0, the pseudo vehicle speed Vi (=Vwmax=VwFL) reaches the predetermined vehicle speed Vo at time t1. When the vehicle speed Vo is reached, the minimum wheel speed Vwmin becomes above the predetermined wheel speed Vwo, necessarily. Thus, in the arithmetic processing of FIG. 5, the diameter-difference ratio $\epsilon$ is calculated according to the expression (5), utilizing the front-left wheel speed VwFL set as the maximum wheel speed Vwmax and the rear wheel speed VwR set as the second highest wheel speed Vw2nd. For the time duration defined by the times t1 and t2 during acceleration, assuming that the maximum wheel speed Vwmax (VwFL) is maintained below the stop diameter-difference ratio wheel speed VwOFF taking in the stop diameter-difference ratio $\epsilon$OFF with respect to the second highest wheel speed Vw2nd, the answer to step S49 is affirmative (YES) and thus the counted value TMR1 of the first timer is not incremented, the error rate ΔK is held at "0" through the filtering process of steps S60, S64 and S65. As a result, the compensation for the front-left wheel speed VwFL (Vwmax) is not executed.

Thereafter, suppose the front-left road wheel 1FL having the maximum wheel speed Vwmax (VwFL) is continuously maintained at the accelerating state for a while, since the front-left wheel speed VwFL fluctuates positively and negatively owing to temporary bouncing motion at the time t3 when shifting from the accelerating state to the straight-ahead driving state wherein the second highest wheel speed Vw2nd (VwR) is essentially equivalent to the actual vehicle speed Vc. Although it is not clearly seen in FIG., 6(a), suppose the maximum wheel speed Vwmax exceeds the stop diameter-difference ratio wheel speed VwOFF at the time t2, and exceeds the minimum diameter-difference ratio wheel speed VwLO at the time t3, and exceeds the maximum diameter-difference ratio wheel speed VwHi at the time t4. For the timer duration defined by the times t3 and t4, since the inequality of VwLO<Vwmax<VwHi is satisfied, that is, the calculated diameter-difference ratio $\epsilon$ is kept within the predetermined band defined by $\epsilon$LO<$\epsilon$<$\epsilon$Hi, the counted value TMR1 of the first timer is incremented through steps S47, S49, S51 and S52. However, since the time duration defined between the times t3 and t4 is shorter than the predetermined time period Δt1 and additionally the maximum wheel speed Vwmax (VwFL) exceeds the maximum diameter-difference ratio wheel speed VwHi at the time t4, the incremented value of the first timer is cleared again to zero at the time t4 by way of the flow from step S51 to step S50. Thereafter, the front-left wheel 1FL having the maximum wheel speed Vwmax (VwFL) transfers gradually to the decelerating state as the acceleration created by the temporary bouncing is reduced to zero. Suppose the maximum wheel speed Vwmax (VwFL) becomes less than the maximum diameter-difference ratio wheel speed VwHi at the time t5, and becomes less than the minimum diameter-difference ratio wheel speed VwLO at the time t6, and becomes less than the stop diameter-difference ratio wheel speed VwOFF at the time t7. For the timer duration defined by the times t5 and t6, since the calculated diameter-difference ratio $\epsilon$ is kept within the predetermined band defined by $\epsilon$LO<$\epsilon$<$\epsilon$Hi owing to the relationship of VwLO Vwmax<VwHi, the counted value TMR1 of the first timer is incremented. However, since the time duration defined between the times t5 and t6 is shorter than the predetermined time period Δt1 and additionally the maximum wheel speed Vwmax (VwFL) becomes less than the minimum diameter-difference ratio wheel speed VwLO at the time t6, the incremented value of the first timer is cleared again to zero at the time t6 by way of the flow from step S51 to step S50 before the counted value TMR1 reaches the predetermined value TMR1o. At the time t7, the counted value TMR2 of the second timer is incremented by way of the flow from step S48 via step S57 to step S58, since the maximum wheel speed Vwmax becomes less than the stop diameter-difference ratio wheel speed VwOFF, i.e., the calculated diameter-difference ratio $\epsilon$ becomes less than the stop diameter-difference ratio $\epsilon$LO. Then, the maximum wheel speed Vwmax exceeds the stop diameter-difference ratio wheel speed VwOFF at the time t8 when shifting from the decelerating state of the front-left wheel 1FL again to the accelerating state, and exceeds the minimum diameter-difference ratio wheel speed VwLO at the time t9. Thereafter, the maximum wheel speed Vwmax (VwFL) is gradually converged towards within the predetermined wheel speed range defined by VwLO<Vwmax<VwHi in accordance with attenuation of the positive and negative fluctuations in the front-left wheel speed VwFL. This means that the maximum wheel speed Vwmax (VwFL) finally settles at a compensated wheel speed precisely taking account of the ratio of the deviation between the outside radius of the different-diameter road wheel 1FL and the outside radius of the other usual-diameter road wheel. For the timer duration defined by the times t7 and t8, since the diameter-difference ratio $\epsilon$ is below the stop diameter-difference ratio $\epsilon$OFF owing to the relationship of Vwmax<VwOFF, the answer to step S48 is negative (NO) and thus the counted value TMR2 of the second timer is incremented through step S57. However, since the time duration defined between the times t7 and t8 is shorter than the predetermined time period Δt2 and additionally the maximum wheel speed Vwmax (VwFL) becomes greater than the stop diameter-difference ratio wheel speed VwOFF at the time t8, the incremented value of the second timer is cleared to zero at the time t8 by way of the flow from step S48 to step S50 before the counted value TMR2 reaches the predetermined value TMR2o. Thereafter, the counted value TMR1 of the timer begins to be incremented from the time t9 when the maximum wheel speed Vwmax (VwFL) becomes greater than the minimum diameter-difference ratio wheel speed VwLO and less than the maximum diameter-difference ratio wheel speed VwHi, i.e., the calculated diameter-difference ratio ε is kept within the predetermined band defined by εLO<ε<εHi. As seen in FIG. 6(a), suppose the counted value TMR1 of the timer reaches the predetermined value TMR1o at the time t10 when the predetermined time period Δt1 has been elapsed from the time t9. Upon the predetermined value TMR1o has been reached, the compensatory condition setting flag Fc is set at "1" through the flow from step S53 to step S55. Immediately when the flag Fc is set, the error rate ΔK is increasingly compensated by the preselected minute modified amounts ΔKo every predetermined sampling time intervals ΔT, so that the diameter-difference ratio ε is adjusted towards the minimum diameter-difference ratio εLO. In accordance with adjustment of the ratio ε towards the minimum ratio εLO, the maximum wheel speed Vwmax (VwFL) is decreasingly compensated as appreciated from the expression (6) (see step S66). In other words, the compensated front-left wheel speed VwFLC is decreasingly compensated towards the minimum diameter-difference ratio wheel speed VwLO, as the diameter-difference ratio ε is decreasingly compensated towards the minimum diameter-difference ratio εLO. As a result, the pseudo vehicle speed Vi is also compensated towards the compensated pseudo vehicle speed Vic (VwFLC). Suppose there are less fluctuations in the maximum wheel speed Vwmax (VwFL) from the time t10 until the time t12 at which the brakes are applied, and thus the compensated front-left wheel speed VwFLC is decreasingly adjusted to the minimum diameter-difference ratio wheel speed VwLO at the time t11. As a result, the compensated pseudo vehicle speed Vic regarded as the compensated front-left wheel speed VwFLC is also compensated over the time duration t10–t11. After the compensated front-left wheel speed VwFLC settles at the minimum diameter-difference ratio wheel speed VwLO at the time t11, the compensated front-left wheel speed VwFLC remains stable until the time t12. Suppose the anti-skid control begins to be executed in order to control the wheel-cylinder pressure of at least one of the four road wheels at the same time brake application is started at the time t12. Thus, the anti-skid control flag AS is set at "1" through the arithmetic processing shown in FIG. 3. Suppose the anti-skid control flag AS remains set at "1" until the brakes are released at the time t34. That is, the flag AS is reset to "0" at the time t34. During anti-skid control, that is, for the time duration defined between times t12 t34, since the flag AS is permanently set at "1", the procedure jumps from step S33 directly to step S34 not via steps S60 to S65. This means that a new calculation for the error rate ΔK is not executed while the flag AS is set. Thus, during the anti-skid control, the compensated front-left wheel speed VwFLC is derived by utilizing the previous error rate ΔK which is previously calculated through the routine shown in FIG. 5 and stored in the memory 25c. Concretely, since the detected front-left wheel speed VwFL is permanently selected as the maximum wheel speed Vwmax as set forth above, the compensated front-left wheel speed VwFLC is calculated by multiplying the maximum wheel speed Vwmax (VwFL) with the coefficient (1−ΔK), where ΔK corresponds to the previous error rate. In other words, the compensated pseudo vehicle speed Vic equivalent to the compensated front-left wheel speed VwFLC is derived on the basis of the previous error rate ΔK for this time duration t12–t34. As previously described, suppose that the actual vehicle speed Vc reduces linearly along the straight line segment having the constant negative gradient, the compensated pseudo vehicle speed Vic becomes equivalent to the sum (εLO·Vc+Vc) obtained by adding the product εLO·Vc of the minimum diameter-difference ratio εLO the actual vehicle speed Vc to the actual vehicle speed Vc. As appreciated from the equation Vic=(εLO·Vc +Vc)=(1+68 LO)·Vc, the compensated pseudo vehicle speed Vic can be regarded as decreasing linearly at a greater constant negative gradient by the minimum diameter-difference ratio εLO as compared with the constant negative gradient of the actual vehicle speed Vc. Actually, on the supposition that the compensated pseudo vehicle speed Vic is set to be equivalent to the compensated front-left wheel speed VwFLC after compensation for the front-left wheel speed VwFL (selected as the maximum wheel speed Vwmax), the compensated pseudo vehicle speed Vic is represented as the product Vi(1−ΔK) obtained by multiplying the pseudo vehicle speed Vi equivalent to the maximum wheel speed Vwmax (VwFL) with the coefficient (1−ΔK), as appreciated from step S66 of FIG. 5. On the other hand, the compensated target wheel speed V*wc is set as the product (1−Sjo)·Vic of a predetermined coefficient (1−Sjo) and the compensated pseudo vehicle speed Vic, while the uncompensated target wheel speed V*w is set as the product (1−Sjo)·Vi of the predetermined coefficient (1−Sjo) and the uncompensated pseudo vehicle speed Vi. Thus, as seen in FIG. 6(a), it will be assumed that the behaviour or variation of the compensated front-left wheel speed VwFLC (indicated by the solid line) with respect to the compensated target wheel speed V*wc (indicated by the solid line) is identical to or substantially equivalent to the behaviour or variation of the uncompensated front-left wheel speed VwFL (indicated by the phantom line) with respect to the uncompensated target wheel speed V*w (indicated by the phantom line). Assuming that the anti-skid brake control is started simultaneously with brake application, the compensated and uncompensated front-left wheel speeds VwFLC and VwFL fluctuate positively and negatively owing to the anti-skid brake control (see FIG. 4). As seen in FIG. 6(a), after initiation of braking operation, the compensated and uncompensated front-left wheel speeds VwFLC and VwFL respectively become below the compensated target wheel speed V*wc and the uncompensated target wheel speed V*w at the time t15, and above them (V*wc and V'w) at the time t17, and below them again at the time t24, and above them again at the time t26, and below them again at the time t30, and above them again at the time t32. Actually, since the compensated front-left wheel speed VwFLC is set to be (1−ΔK) times as large as the uncompensated front-left wheel speed VwFL, the compensated front-left wheel acceleration/deceleration indicative signal value V'wFLC is also set to be (1−ΔK) times as large as the uncompensated front-left wheel acceleration/deceleration indicative signal value V'wFL. Owing to the difference between the compensated and uncompensated front-left wheel acceleration/deceleration indicative signal values $V'_{wFLC}$ and $V'_{wFL}$, the time when the compensated front-left wheel acceleration/deceleration indicative signal value $V'_{wFLC}$ becomes less than the negative threshold $\alpha$ for the pressure-reduction start timing or greater than the positive threshold $\beta$ for the pressure build-up start timing, is different from the time when the uncompensated front-left wheel acceleration/deceleration indicative signal value $V'_{wFL}$ becomes less than the negative threshold $\alpha$ or greater than the positive threshold $\beta$. As illustrated in FIG. 4, in case that the negative threshold $\alpha$ corresponds to a threshold necessary to switch from the moderate pressure build-up mode to the high-pressure hold mode and the positive threshold $\beta$ corresponds to a threshold necessary to switch from the pressure-reduction mode to the low-pressure hold mode, a retardation of the timing at which the compensated front-left wheel acceleration/deceleration indicative signal value $V'_{wFLC}$ reaches the negative threshold $\alpha$ with respect to the timing at which the uncompensated front-left wheel acceleration/deceleration indicative signal value $V'_{wFL}$ reaches the negative threshold $\alpha$ is substantially equal to a retardation of the timing at which the compensated front-left wheel acceleration/deceleration indicative signal value $V'_{wFLC}$ reaches the positive threshold $\beta$ with respect to the timing at which the uncompensated front-left wheel acceleration/deceleration indicative signal value $V'_{wFL}$ reaches the positive threshold $\beta$. Likewise, an advancement of the timing at which the compensated front-left wheel acceleration/deceleration indicative signal value $V'_{wFLC}$ reaches the negative threshold $\alpha$ with respect to the timing at which the uncompensated front-left wheel acceleration/deceleration indicative signal value $V'_{wFL}$ reaches the negative threshold $\alpha$ is substantially equal to an advancement of the timing at which the compensated front-left wheel acceleration/deceleration indicative signal value $V'_{wFLC}$ reaches the positive threshold $\beta$ with respect to the timing at which the uncompensated front-left wheel acceleration/deceleration indicative signal value $V'_{wFL}$ reaches the positive threshold $\beta$. That is, as appreciated from the equations $V^*_{wc}=(1-S_{jo})V_{wFL}$ and $V^*_{w}=(1-S_{jo})V_{wFL}$, the timing at which the compensated front-left wheel speed $V_{wFLC}$ goes across the compensated target wheel speed $V^*_{wC}$ essentially coincides with the timing at which the uncompensated front-left wheel speed $V_{wFL}$ goes across the uncompensated target wheel speed $V^*_{w}$, irrespective of compensation or uncompensation for the front-left wheel speed (the different-diameter wheel speed). Actually, in FIG. 6(a), for the time duration t12–t34, if the characteristic curve (indicated by the solid line) of the compensated front-left wheel speed $V_{wFLC}$ is vertically moved upwards, this characteristic curve may be overlapped with the characteristic curve (indicated by the phantom line) of the uncompensated front-left wheel speed $V_{wFL}$. That is, the characteristic of the wheel-cylinder pressure of the different-diameter front-left road wheel 1FL controlled by the anti-skid control based on the compensated target wheel speed $V^*_{wC}$ is substantially equivalent to that controlled by the anti-skid control based on the uncompensated target wheel speed $V^*_{w}$. As set forth above, the front-left wheel speed can be properly and timely controlled so that the slip ratio $S_j$ of the front-left road wheel is adjusted to the reference slip ratio $S_{jo}$. As a result, the front-left wheel brake locking can be avoided and also the steering effect and the shorter braking distance can be assured.

Thereafter, in transit from the straight-ahead driving state to the left-angle turning state for the time duration from the time t34 to the time t36, the anti-skid control flag AS is set at "0" at the time t34. in response to termination of the braking operation. However, since the compensatory condition flag Fc is set at "1", the calculation for the error rate $\Delta K$ is initiated by way of the flow from step S47 through steps S48, S50 and S54 to step S61, utilizing a new diameter-difference ratio $\epsilon$ newly derived by way of the flow from step S33 through steps S35, S36, S37, S38, S39, S40, S42 and S44 to S46. For the time duration defined by the times t34 and t36, suppose the second highest wheel speed Vw2nd ($V_{wR}$) is maintained at a constant speed, while the maximum wheel speed Vwmax ($V_{wFL}$) continuously reduces after brake release. In this case, both the calculated diameter-difference ratio $\epsilon$ and the calculated error rate $\Delta K$ continuously reduce. The maximum wheel speed Vwmax ($V_{wFL}$) becomes less than the stop diameter-difference ratio wheel speed $V_{wOFF}$ correlated with the stop diameter-difference ratio $\epsilon_{OFF}$ at the time t35. Thus, the counted value TMR2 of the second timer is incremented from the time t35 by way of the flow from step S48 to step S57. Thereafter, upon the predetermined time period $\Delta t_2$ has been elapsed, i.e., the counted value TMR2 has been reached the predetermined value TMR2o at the time t37, the compensatory condition setting flag Fc is reset at "0" through the flow from step S58 to step S59. Simultaneously, the error rate $\Delta K$ is gradually adjusted towards "0" by preselected minute modified amounts $\Delta K_o$ through steps S60, S64 and S65. As a result, the compensated front-left wheel speed $V_{wFLC}$ is increasingly compensated towards the uncompensated front-left wheel speed $V_{wFL}$ (selected as the maximum wheel speed Vwmax). Therefore, the pseudo vehicle speed Vi itself is also compensated towards the compensated vehicle speed ViC equivalent to the compensated front-left wheel speed $V_{wFLC}$. In accordance with the convergence of the compensated front-left wheel speed $V_{wFLC}$ towards the uncompensated front-left wheel speed $V_{wFL}$, the compensated pseudo vehicle speed ViC coincides with the uncompensated front-left wheel speed $V_{wFL}$ at the time t38. After the time t38, the condition of ViC=$V_{wFL}$ is continued.

In the other road wheels with the usual tire as well as the front-left different-diameter road wheel 1FL with the small-sized tire, their braking force control or wheel-brake cylinder pressure control must be properly executed. Hereinbelow, exemplified is variation in the rear wheel-cylinder pressure PR during braking, i.e., for the time duration t12–t34.

In case that the pseudo vehicle speed is compensated as the compensated pseudo vehicle speed ViC and thus the target wheel speed is also compensated as the compensated target wheel speed $V^*_{wC}$, the rear wheel speed $V_{wR}$ (Vw2nd) based on the compensated target wheel speed $V^*_{wC}$, the rear wheel acceleration/deceleration $V'_{wR}$ (V'w2nd) and the rear wheel-brake cylinder pressure PR which pressure is controlled according to the anti-skid control executed on the basis of the compensated target wheel speed $V^*_{wC}$ vary as indicated by the solid lines of FIGS. 6(f), 6(g) and 6(h). At the beginning of braking, the rapid pressure build-up mode is selected, with the result that the rear wheel cylinder pressure PR is rapidly increased. Owing to the increase in the rear wheel cylinder pressure PR, the rear wheel speed $V_{wR}$ (Vw2nd) decreases and thus the rear wheel acceleration/deceleration $V'_{wR}$ (V'w2nd) corresponding to the gradient or differential of the rear wheel speed $V_{wR}$ decreases. The control mode for the rear wheel cylinder pressure PR is shifted from the rapid pressure build-up mode to the high-pressure hold mode at the time t14 when the rear wheel acceleration/deceleration $V'_{wR}$ becomes less the predetermined negative threshold $\alpha$. Thus, the rear wheel cylinder pressure PR is held at a comparatively high pressure level at the time t14 just before shift to the high-pressure hold mode, and as a result the negative gradient of the rear wheel speed VwR becomes stable. The rate of decrease in the rear wheel acceleration/deceleration V'wR becomes reduced. At the time t15 when the rear wheel speed VwR becomes less than the compensated target wheel speed V*wC calculated on the basis of the compensated pseudo vehicle speed ViC and the reference slip ratio Sjo, i.e., the slip ratio Sj of the rear wheel exceeds the reference slip ratio Sjo, the control mode is shifted to the pressure-reduction mode, and as a result the rear wheel cylinder pressure PR is reduced at a predetermined gradient by way of the hydraulic actuator 6R. Shortly, the rear wheel speed VwR (Vw2nd) begins to increase as indicated by the solid line in FIG. 6(f), while the rear wheel acceleration/deceleration V'wR (V'w2nd) increases towards within the positive region (the acceleration region) in the form of cubic curve as seen in FIG. 6(g). At the above-noted time t15, owing to the relation of Sj<Sjo, the anti-skid control flag AS is set at "1" and additionally the counted value T of the pressure-reduction timer is set to the predetermined value To by way of the flow from step S4 via step S5 to step S8 in FIG. 3. At the time t18 when the rear wheel acceleration/deceleration V'wR (V'w2nd) exceeds the predetermined positive threshold 13, the counted value T of the pressure-reduction timer is reset to "0" through the flow from step S5 to step S7 in FIG. 3, and as a result the pressure control mode is shifted from the pressure-reduction mode to the low-pressure hold mode through the flow from step S7 through steps S9, S12, S15 and S16 to step S20. Thus, the rear wheel cylinder pressure PR is held at a comparatively low pressure level just before shift to the low-pressure hold mode, and as a result the positive gradient of the rear wheel speed VwR becomes stable. Also, the rate of increase in the rear wheel acceleration/deceleration V'wR becomes reduced. Thereafter, the rear wheel acceleration/deceleration V'wR begins to reduce within the acceleration region. Presently, the rear wheel acceleration/deceleration V'wR becomes less than the predetermined threshold β at the time t19 at which the pressure control mode is shifted from the low-pressure hold mode to the moderate pressure build-up mode and then the rear wheel cylinder pressure PR is moderately increased at a predetermined gradient. In accordance with the increase in the pressure PR, the braking force applied to the rear wheel is increased and then the rear wheel acceleration/deceleration V'wR also decreases towards within the negative region (the deceleration region) in the form of cubic curve and shortly reaches a point of inflexion substantially at the time point t20, as seen in FIG. 6(g). Thereafter, variations in the respective factors VwR, V'wR, and PR are repeated in the same manner as the time duration t12–t20. Concretely, the pressure control mode is shifted to the high-pressure hold mode at the time t22 when the rear wheel acceleration/deceleration V'wR becomes less than the negative threshold α, and to the pressure-reduction mode at the time t23 when the rear wheel speed VwR becomes less than the compensated target wheel speed V*wC, and to the low-pressure hold mode at the time t25 when the rear wheel acceleration/deceleration V'wR becomes greater than the positive threshold α, and to the moderate pressure build-up mode at the time t27 when the rear wheel acceleration/deceleration V'wR becomes less than the positive threshold β, and to the high-pressure hold mode at the time t29 when the rear wheel acceleration/deceleration V'wR becomes less than the negative threshold α, and to the pressure-reduction mode at the time t30 when the rear wheel speed VwR becomes less than the compensated target wheel speed V*wC, and to the low-pressure hold mode at the time t32 when the rear wheel acceleration/deceleration V'wR becomes greater than the positive threshold β, and to the moderate pressure build-up mode at the time t33 when the rear wheel acceleration/deceleration V'wR becomes less than the positive threshold β. Upon the brakes are released at the time t34, the rear wheel cylinder pressure is quickly reduced towards zero at a steep gradient, as indicated by the broken line of FIG. 6(h).

In contrast to the above, in case that the pseudo vehicle speed is uncompensated as the uncompensated pseudo vehicle speed Vi and thus the target wheel speed is also uncompensated as the uncompensated target wheel speed V'w, the rear wheel speed VwRN (Vw2ndN) based on the uncompensated target wheel speed V'w, the rear wheel acceleration/deceleration V'wRN (V'w2ndN) based on the rear wheel speed VwRN (Vw2ndN) and the rear wheel-brake cylinder pressure PRN which pressure is controlled according to the anti-skid control executed on the basis of the uncompensated target wheel speed V*w vary as indicated by the phantom lines of FIGS. 6(f), 6(g) and 6(h). Upon the initiation of braking the time t12, the rear wheel-brake cylinder pressure PRN is increasingly adjusted in the rapid pressure build-up mode and thus the rear wheel speed VwRN (Vw2ndN) decreases quickly, increasing its negative gradient. Thus, the rear wheel acceleration/deceleration V'wRN (V'w2ndN) also decreases within the negative region. Owing to the relation of V*w>V*wC, the pressure-reduction mode begins at the time t13 in this anti-skid control (deceleration-slip control) based on the uncompensated target wheel speed V'w, whereas the pressure-reduction mode begins at the time t15 in the previously explained anti-skid control (deceleration-slip control) based on the compensated target wheel speed V*wC. That is, the pressure-reduction start timing is advanced in case of the anti-skid control based on the uncompensated target wheel speed V*w. At the time t13 when the rear wheel speed VwR becomes less than the uncompensated target wheel speed V'w, i.e., the slip ratio Sj of the rear wheel exceeds the reference slip ratio Sjo, the pressure control mode is shifted to the pressure-reduction mode by way of the flow from step S4 through steps S5, S8, S9 and S12 to step S14. in FIG. 3. Under the rear wheel cylinder pressure reduced, the gradient of the rear wheel speed VwRN is gradually transferred from the negative gradient to the positive gradient, and thus the rear wheel acceleration/deceleration V'wRN also increases. Thereafter, since the rear wheel speed VwRN exceeds the uncompensated target wheel speed V'w at the time t16 before the rear wheel acceleration/deceleration V'wRN exceeds the positive threshold β, the pressure control mode is shifted from the pressure-reduction mode to the moderate pressure build-up mode as indicated by the broken line in the control pattern of FIG. 4 (see steps S15, S17, S19 and S21 in the arithmetic processing of FIG. 3). Shortly, the rear wheel speed VwRN (Vw2ndN) begins to decrease as indicated by the phantom line in FIG. 6(f), while the rear wheel acceleration/deceleration V'wRN (V'w2ndN) decreases towards within the negative region (the deceleration region) in the form of cubic curve as indicated by the phantom line in FIG. 6(g). However, since the rear wheel speed VwRN becomes less the uncompensated target wheel speed V'w, i.e., the slip ratio of the rear wheel exceeds the reference slip ratio Sjo at the time t20 before the rear wheel acceleration/deceleration V'wRN becomes less the negative threshold α, the pressure control mode is shifted to the pressure-reduction mode in the same manner as the time t13. Thereafter, the moderate pressure build-up mode and the pressure-reduction modes are alternately repeated in such a manner that the control mode is shifted to the moderate pressure build-up mode at the time t21, and to the pressure-reduction mode at the time t27, and to the moderate pressure build-up mode at the time t28, and to the pressure-reduction mode at the time t31, and to the moderate pressure build-up mode at the time t33. After brake release at the time t34, the rear wheel cylinder pressure PRN is quickly reduced.

In comparison between variations in the rear wheel cylinder pressure PR based on the compensated target wheel speed V'wc and the rear wheel cylinder pressure PRN based on the uncompensated target wheel speed V'w, the pressure-reduction start timing for the rear wheel cylinder pressure PRN tends to be advanced (see the times t13 and t15 of the time chart shown in FIG. 6(h)). Additionally, the pressure-reduction mode (see the negative gradient of the pressure PRN) and the moderate pressure build-up mode (see the positive gradient of the pressure PRN) are alternately repeated at a comparatively short cycle in the anti-skid control made to the rear wheel cylinder pressure PRN, i.e., in case that the different-diameter front-left wheel speed VwFL is compensated, whereas the pressure-reduction mode (see the negative gradient of the pressure PR), the low-pressure hold mode (see the lower horizontal line of the characteristic graph of the pressure PR), the moderate pressure build-up mode(see the positive gradient of the pressure PR), the high-pressure hold mode (see the upper horizontal line of the characteristic graph of the pressure PR) are repeated in that order in the anti-skid control made to the rear wheel cylinder pressure PR in case that the different-diameter front-left wheel speed VwFLis uncompensated. That is, the deviation between the uncompensated target wheel speed V'w and the detected rear wheel speed VwRN is comparatively small. On the whole, this means that the rear wheel cylinder pressure PRN is suppressed at a comparatively low level, as compared with the rear wheel cylinder pressure PR. In FIG. 6(h), there is less difference between the integral of the rear wheel cylinder pressure PR between the times t12 through t34 (the total area sandwiched between the base line including the origin O and the characteristic graph of the rear wheel cylinder pressure PR) and the integral of the rear wheel cylinder pressure PRN between the times t12 through t34 (the total area sandwiched between the base line including the origin O and the characteristic graph of the rear wheel cylinder pressure PRN). The above-mentioned total area corresponds to the work load for braking achieved by the anti-kid control. Judging from the two graphs in FIG. 6(h), it seems that the work load achieved by the anti-skid control based on the compensated target wheel speed V'wc is almost the same as the work load achieved by the anti-skid control based on the uncompensated target wheel speed V'w. However, the wheel cylinder pressure of the front-left road wheel 1FR with the usual tire may also tend to be suppressed in the same manner as the tendency of suppression of the wheel cylinder pressure PRN of the rear road wheel with the usual tire. As previously explained, the wheel-cylinder pressure characteristic of the small-sized front-left road wheel 1FL during the anti-skid control based on the compensated target wheel speed V'w is substantially equal to that during anti-skid control based on the uncompensated target wheel speed V'wc. On the whole, the total braking force acting on the vehicle is relatively small in case of the anti-skid control based on the uncompensated target wheel speed V'w. Owing to the relatively small braking force, during the anti-skid control in case that the different-diameter front-left wheel speed VwFL is uncompensated, a degree of decrease in the actual vehicle speed Vc tends to be smaller than during the anti-skid control in case that the different-diameter front-left wheel speed is compensated as the compensated wheel speed VwFLC, with the result that the time duration between the pressure-reduction start timing and the pressure build-up timing tends to be further extended. Assuming that the pressure-reduction timing is maintained constant, the pressure build-up timing will be retarded.

As will be appreciated from the above, in the case that the wheel speed the different-diameter road wheel with the small-sized tire is uncompensated, the wheel-cylinder pressure at each road wheel with the usual tire tends to be suppressed at a relatively low level, and on the whole the total braking force acting on the vehicle tends to be small. On the other hand, in the case that the wheel speed the different-diameter road wheel with the small-sized tire is compensated as set out above, the slip ratio Sj of each road wheel is calculated on the basis of the compensated pseudo vehicle speed Vic substantially equivalent to the actual vehicle speed Vc, and the calculated slip ratio is adjusted towards the reference slip ratio Sjo. Therefore, the system according to the invention can assure a shorter braking distance by the suitably controlled braking force, and prevent wheel-lock (skidding) and thus provide maximum effective braking, and also insure a suitable steering effect.

In the previously-explained embodiment, although the three-sensor, three-channel type anti-skid control system is exemplified, the teaching of the present invention may be applied to a four-sensor, four-channel type anti-skid control system with four wheel-speed sensors, respectively attached to front-left, front-right rear-left and rear-right road wheels. Furthermore, although the anti-skid control system of the present embodiment is exemplified in case of the rear-wheel drive vehicle, the system of the invention may be applied to a front-wheel drive vehicle or four-wheel drive vehicle. Moreover, although the select-HIGH wheel speed VwH is utilized for the purpose of calculation of a pseudo vehicle speed Vi or a compensated pseudo vehicle speed Vic, a select-LOW switch may be added so that the select-HIGH wheel speed is utilized in presence of the anti-skid control and the select-LOW wheel speed is utilized in absence of the anti-skid control.

As will be appreciated from the above, the system of the invention derives an error rate of a different-diameter road wheel with a small-sized emergency tire to the other road wheel with a usual tire from the rate of difference between the outside diameter between the different-diameter road wheel and the usual-diameter road wheel in the stable traveling state of the vehicle, and compensates the different-diameter wheel speed by utilizing the derived error rate so that the compensated different-diameter wheel speed can be equivalent to the actual different-diameter wheel speed, whereas the prior art system derives the different-diameter wheel speed by multiplying the detected angular velocity of the different-diameter road wheel by the nominal outside radius of the road wheel with the usual tire. The compensated pseudo vehicle speed Vic based on the basis of the compensated different-diameter wheel speed is also equivalent to the actual vehicle speed. Utilizing the expression (1) with the compensated pseudo vehicle speed Vic, the slip ratio of the different-diameter tire road wheel is accurately derived, while the slip ratio of the usual tire road wheel is accurately derived. Thus, even when an emergency small-sized tire such as a temper tire is installed on the vehicle, during braking, the anti-skid control can be precisely effectively executed at the respective road wheels by way of the above-noted precise compensation of the different-diameter wheel speed. A high accuracy of the anti-skid control, particularly an accurate pressure-reduction start timing and an accurate pressure build-up start timing, can be assured by way of a pseudo vehicle speed derived by using the compensated different-diameter wheel speed as well as the wheel speeds of the usual-tire road wheels. Additionally, the calculation for the error rate can be executed only under the above-noted particular condition, and thus its reliability is high. Moreover, although the error rate itself fluctuates owing to fluctuations in the respective wheel speeds during traveling of the vehicle, the system of the invention prevents the undesired fluctuations from having a bad influence (a rapid change in the error rate) on the error rate by way of a filtering process. In the embodiment, the error rate itself is subjected to the filtering process, so as to prevent a rapid change in the error rate when the error rate is adjusted towards its target value. Alternatively, the compensated different-diameter wheel speed derived by utilizing an unfiltered error rate may be subjected to a proper filtering process.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An anti-skid control system for an automotive vehicle, comprising:

sensor means for detecting a wheel speed of each road wheel of the vehicle;

control means for controlling a wheel-brake cylinder pressure of each road wheel;

compensation means for compensating a different-diameter wheel speed of a different-diameter road wheel with a small-sized tire in case that one of the road wheels is the different-diameter road wheel; and error rate calculation means for calculating an error rate of the different-diameter wheel speed with respect to the detected wheel speed of the other road wheel with a usual tire on the basis of a maximum wheel speed corresponding to the different-diameter wheel speed and the detected wheel speed of the other road wheel, except at least during anti-skid control;

wherein said compensation means compensates the different-diameter wheel speed by said error rate;

wherein a first calculation means is provided for deriving a compensated vehicle speed from the compensated different-diameter wheel speed, and a second calculation means is provided for deriving a slip ratio of the different-diameter road wheel from the compensated vehicle speed and the compensated different-diameter wheel speed and deriving a slip ratio of the other road wheel from the compensated vehicle speed and the detected wheel speed of the other road wheel, wherein said control means controls each wheel-brake cylinder pressure so that the slip ratio is adjusted to a predetermined reference slip ratio.

2. An anti-skid control system for an automotive vehicle, comprising:

sensor means for detecting a wheel speed of each road wheel of the vehicle;

control means for controlling a wheel-brake cylinder pressure of each road wheel;

compensation means for compensating a different-diameter wheel speed of a different-diameter road wheel with a small-sized tire in case that one of said road wheels is the different-diameter road wheel;

diameter-difference ratio derivation means for deriving a ratio of diameter-difference between an outside diameter of the different-diameter road wheel and an outside diameter of the other road wheel with a usual tire, on the basis of a maximum wheel speed corresponding to the different-diameter wheel speed and a second highest wheel speed of the wheel speeds detected by said sensor means; and error rate calculation means for calculating an error rate of the different-diameter wheel speed with respect to the detected wheel speed of the other road wheel, on the basis of said ratio of diameter-difference, except at least during anti-skid control;

wherein said compensation means compensates the different-diameter wheel speed by said error rate;

wherein a first calculation means is provided for deriving a compensated vehicle speed from the compensated different-diameter wheel speed, and a second calculation means is provided for deriving a slip ratio of the different-diameter road wheel from the compensated vehicle speed and the compensated different-diameter wheel speed and deriving a slip ratio of the other road wheel from the compensated vehicle speed and the detected wheel speed of the other road wheel, wherein said control means controls each wheel-brake cylinder pressure so that the slip ratio is adjusted to a predetermined reference slip ratio.

3. An anti-skid control system for an automotive vehicle, comprising:

sensor means for detecting a wheel speed of each road wheel of the vehicle;

control means for controlling a wheel-brake cylinder pressure of each road wheel to prevent deceleration slip during braking;

compensation means for compensating a different-diameter wheel speed of a different-diameter road wheel with a small-sized tire in case that one of said road wheels is the different-diameter road wheel;

diameter-difference ratio derivation means for deriving a ratio of diameter-difference between an outside diameter of the different-diameter road wheel and an outside diameter of the other road wheel with a usual tire, on the basis of a maximum wheel speed corresponding to the different-diameter wheel speed and a second highest wheel speed of the wheel speeds detected by said sensor means; and error rate calculation means for calculating an error rate of the different-diameter wheel speed with respect to the detected wheel speed of the other road wheel, on the basis of said ratio of diameter-difference, except at least during anti-skid control;

wherein said compensation means compensates the different-diameter wheel speed by said error rate;

wherein a first calculation means is provided for deriving a compensated pseudo vehicle speed from the compensated different-diameter wheel speed, and said second calculation means is provided for deriving a slip ratio of the different-diameter road wheel from the compensated pseudo vehicle speed and the compensated different-diameter wheel speed and deriving a slip ratio of the other road wheel from the compensated vehicle speed and the detected wheel speed of the other road wheel, wherein said control means controls each wheel-brake cylinder pressure so that the slip ratio is adjusted to a predetermined reference slip ratio, wherein said compensation means compensates the different-diameter wheel speed by said error rate under a particular condition in which, in absence of the anti-skid control, said ratio of diameter-difference is greater than a predetermined minimum ratio of diameter-difference corresponding to a threshold of a lower dead zone and less than a predetermined maximum ratio of diameter-difference corresponding to a threshold of an upper dead zone, for a predetermined first period of time.

4. The anti-skid control system as claimed in claim 3, wherein said compensation means inhibits a compensation for the different-diameter wheel speed when said ratio of diameter-difference is less than or equal to a predetermined additional ratio of diameter-difference for a predetermined second period of time.

5. The anti-skid control system as claimed in claim 4, wherein said predetermined first period is set to be greater than said predetermined second period.

6. The anti-skid control system as claimed in claim 3, wherein said compensation means includes filtering means for setting a modified amount in said error rate derived from said error rate calculation means every predetermined sampling time intervals at a preselected minute modified amount through a filtering process, to prevent a rapid change in said error rate when said error rate is adjusted towards a target value.

7. The anti-skid control system as claimed in claim 6, wherein said target value of said error rate is set at a difference between said rate of diameter-difference and said predetermined minimum ratio of diameter-difference when said particular condition is satisfied and said target value of said error rate is set at zero when said ratio of diameter-difference is less than or equal to said predetermined additional ratio of diameter-difference for said predetermined second period of time.

8. The anti-skid control system as claimed in claim 3, wherein said compensation means inhibits a new calculation of said error rate when said compensated pseudo vehicle speed from said first calculation means is less than a predetermined vehicle speed.

9. The anti-skid control system as claimed in claim 3, wherein said compensation means inhibits a new calculation of said error rate when a minimum wheel speed of the detected wheel speeds is less than a predetermined wheel speed correlated with said minimum ratio of diameter-difference.

* * * * *

UNITED STATES PATENT AND TRADEMARK OFFICE
CERTIFICATE OF CORRECTION

PATENT NO. : 5,498,072
DATED : March 12, 1996
INVENTOR(S) : Kouichi SHIMIZU

It is certified that error appears in the above-indentified patent and that said Letters Patent is hereby corrected as shown below:

On the title page, item [22] should read as follows:

--[22] Filed:    May 23, 1995--

Signed and Sealed this

Sixteenth Day of July, 1996

Attest:

BRUCE LEHMAN

Attesting Officer    Commissioner of Patents and Trademarks